(12) United States Patent
Williams et al.

(10) Patent No.: US 11,887,044 B2
(45) Date of Patent: Jan. 30, 2024

(54) ANALYSIS AND CORRECTION OF SUPPLY CHAIN DESIGN THROUGH MACHINE LEARNING

(71) Applicant: KINAXIS INC., Ottawa (CA)

(72) Inventors: Phillip Williams, Ottawa (CA); Zhen Lin, Kanata (CA); Behrouz Haji Soleimani, Halifax (CA); Seyednaser Nourashrafeddin, Ottawa (CA); Chantal Bisson-Krol, Kanata (CA); Marcio Oliveira Almeida, Stittsville (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/740,869

(22) Filed: May 10, 2022

(65) Prior Publication Data

US 2022/0335378 A1 Oct. 20, 2022

Related U.S. Application Data

(63) Continuation of application No. 17/061,422, filed on Oct. 1, 2020, now Pat. No. 11,361,276, which is a continuation of application No. 16/223,938, filed on Dec. 18, 2018, now Pat. No. 10,846,651, which is a
(Continued)

(51) Int. Cl.
*G06Q 10/083* (2023.01)
*G06N 20/00* (2019.01)
*G06F 18/2321* (2023.01)

(52) U.S. Cl.
CPC ..... *G06Q 10/0838* (2013.01); *G06F 18/2321* (2023.01); *G06N 20/00* (2019.01)

(58) Field of Classification Search
CPC . G06Q 10/0838; G06N 20/00; G06F 18/2321
See application file for complete search history.

(56) References Cited

U.S. PATENT DOCUMENTS 6,496,806 B1 * 12/2002 Horwitz ............... G06Q 10/087
705/28
6,611,726 B1 8/2003 Crosswhite
(Continued)

FOREIGN PATENT DOCUMENTS

AU 2003298877 A1 6/2004
CA 2981748 A1 4/2018
(Continued)

OTHER PUBLICATIONS

Plex DemandCaster "What Is Lead Time Variability and How Can You Beat It?" (2018) (https://www.plex.com/blog/what-lead-time-variability-and-how-can-you-beat-it) (Year: 2018).*
(Continued)

*Primary Examiner* — Sujay Koneru
(74) *Attorney, Agent, or Firm* — Borden Ladner Gervais LLP; Jeffrey Coghlan

(57) ABSTRACT

A dynamic supply chain planning system for analysis of historical lead time data that uses machine learning algorithms to forecast future lead times based on historical lead time data, weather data and financial data related to locations and dates within the supply chain.

18 Claims, 18 Drawing Sheets

Related U.S. Application Data continuation-in-part of application No. 16/147,311, filed on Sep. 28, 2018, now Pat. No. 10,832,196.

(60) Provisional application No. 62/725,345, filed on Aug. 31, 2018.

(56) References Cited

U.S. PATENT DOCUMENTS

| | | | |
|---|---|---|---|
| 8,428,987 B2* | 4/2013 | Najmi | G06Q 30/0202 705/7.11 |
| 8,494,823 B2 | 7/2013 | Ding et al. | |
| 8,600,981 B1 | 12/2013 | Chau et al. | |
| 9,600,779 B2* | 3/2017 | Hoover | G06F 3/0481 |
| 10,032,180 B1 | 7/2018 | Shariff et al. | |
| 10,846,651 B2 | 11/2020 | Oliveira Almeida et al. | |
| 2002/0138358 A1 | 9/2002 | Scheer | |
| 2002/0143604 A1 | 10/2002 | Cox et al. | |
| 2003/0061213 A1* | 3/2003 | Yu | G06N 20/00 |
| 2005/0171825 A1 | 8/2005 | Denton et al. | |
| 2007/0143156 A1 | 6/2007 | Van Deursen | |
| 2007/0203810 A1 | 8/2007 | Grichnik | |
| 2008/0065436 A1 | 3/2008 | Wu et al. | |
| 2010/0114554 A1* | 5/2010 | Misra | G06Q 10/00 703/22 |
| 2010/0125486 A1 | 5/2010 | Sinclair et al. | |
| 2010/0138264 A1 | 6/2010 | Faris et al. | |
| 2012/0076283 A1* | 3/2012 | Ajmera | H04M 3/5183 379/93.17 |
| 2012/0173456 A1* | 7/2012 | Hirl | G06Q 50/16 706/46 |
| 2014/0122179 A1 | 5/2014 | Chan et al. | |
| 2014/0192050 A1 | 7/2014 | Qiu et al. | |
| 2015/0046361 A1 | 2/2015 | Williams et al. | |
| 2015/0066552 A1 | 3/2015 | Shami | |
| 2016/0027026 A1 | 1/2016 | Matsui et al. | |
| 2016/0048852 A1* | 2/2016 | Beh | G06Q 30/0206 705/7.31 |
| 2016/0299255 A1 | 10/2016 | Dail et al. | |
| 2016/0371618 A1 | 12/2016 | Leidner et al. | |
| 2017/0006135 A1 | 1/2017 | Siebel et al. | |
| 2017/0011560 A1 | 1/2017 | Sheldon et al. | |
| 2017/0017896 A1 | 1/2017 | Hamann et al. | |
| 2017/0063909 A1 | 3/2017 | Muddu et al. | |
| 2017/0124495 A1 | 5/2017 | Saxena et al. | |
| 2017/0154347 A1 | 6/2017 | Bateman | |
| 2017/0191847 A1* | 7/2017 | Chintakindi | G01C 21/3484 |
| 2017/0236060 A1 | 8/2017 | Ignatyev | |
| 2018/0101814 A1* | 4/2018 | Nadella | G06Q 10/087 |
| 2018/0123909 A1 | 5/2018 | Venkitapathi et al. | |
| 2018/0150547 A1* | 5/2018 | Pallath | G06N 20/20 |
| 2018/0174219 A1* | 6/2018 | Jadhav | G06Q 50/01 |
| 2018/0203915 A1 | 7/2018 | Marshall et al. | |
| 2018/0322462 A1 | 11/2018 | Jayaraman et al. | |
| 2019/0087247 A1 | 3/2019 | Chakraborty et al. | |
| 2019/0095842 A1 | 3/2019 | Brousseau | |
| 2019/0156298 A1* | 5/2019 | Ethington | G06Q 10/0635 |
| 2019/0171194 A1 | 6/2019 | Sato et al. | |
| 2019/0198136 A1 | 6/2019 | Hou et al. | |
| 2019/0227193 A1* | 7/2019 | Caruzzo | C12Q 1/6832 |
| 2019/0258978 A1 | 8/2019 | Mahajan et al. | |

FOREIGN PATENT DOCUMENTS

| | | |
|---|---|---|
| CN | 110503225 A * | 11/2019 |
| WO | 2015191443 A1 | 12/2015 |

OTHER PUBLICATIONS

Berlec et al., "Predicting Order Lead Times," Journal of Mechanical Engineering, Sep. 2007, vol. 54(2008)5, pp. 308-321.
German Patent Application No. DE112019004260.2, Office Action dated Jun. 20, 2022—English Translation available.
German Patent Application No. DE112019004261.0, Office Action dated Jun. 22, 2022—English Translation available.
International Patent Application No. PCT/CA2019/051222, International Preliminary Report on Patentability dated Mar. 11, 2021.
International Patent Application No. PCT/CA2019/051223, International Preliminary Report on Patentability dated Dec. 7, 2020.
International Patent Application No. PCT/CA2019/051223 International Search Report and Written Opinion dated Nov. 28, 2019.
International Search Report from related international application No. PCT/CA2019/051222.
Lingitz et al., "Lead Time Prediction Using Machine Learning Algorithms: a Case Study by a Semiconductor Manufacturer," 51st CIRP Conference on Manufacturing Systems, Procedia CIRP, vol. 72 (2018), pp. 1051-1056.
U.S. Appl. No. 17/061,422 Notice of Allowance dated Feb. 11, 2022.
United Kingdom Patent Application No. GB2102941.8, Office Action dated Apr. 1, 2022.
U.S. Appl. No. 16/147,311, Non-Final Office Action dated Jun. 15, 2020.
U.S. Appl. No. 16/147,311 Notice of Allowance dated Jul. 27, 2020.
U.S. Appl. No. 16/223,938, Non-Final Office Action dated Aug. 27, 2020.
U.S. Appl. No. 16/223,938 Notice of Allowance dated Sep. 10, 2020.
U.S. Appl. No. 17/060,225, Non-Final Office Action dated Sep. 20, 2021.
U.S. Appl. No. 17/060,225 Notice of Allowance dated Oct. 21, 2021.
U.S. Appl. No. 17/061,422, Non-Final Office Action dated Oct. 22, 2021.
Kharfan et al., Forecasting Seasonal Footwear Demand Using Machine Learning, 2018, (https://dspace.mit.edu/bitstream/handle/1721.1/117612/Chan_Kharfan_2018_Capstone.pdf?sequence=1).
U.S. Appl. No. 17/485,781, Non Final office Action dated Oct. 19, 2022.
U.S. Appl. No. 17/485,781, Notice of Allowance dated Mar. 22, 2023.

* cited by examiner

KEY

1. hub future weather indications filtered features mean
2. indicators filtered features mean
3. indicators filtered features
4. hub future weather indicators time filtered features mean
5. hub future time filtered features mean
6. hub future time filtered features
7. weather time filtered features mean
8. future time all features mean
9. hub time filtered features mean
10. hub future weather indicators filtered features
11. future time all features
12. hub weather filtered features mean
13. weather filtered features mean
14. future filtered features mean
15. weather time all features mean
16. hub weather filtered features
17. weather filtered features mean
18. hub weather time all features mean
19. indicators time filtered features
20. control time mean
21. hub time all features mean
22. hub filtered features mean
23. hub future time all features mean
24. hub weather time filtered features
25. future all features mean
26. hub future weather indicators time all features mean
27. hub time filtered features
28. future time all features
29. hub future all features mean 30. indicators all features mean
31. hub future time filtered features
32. hub weather all features mean
33. weather time filtered features
34. weather all features mean
35. future time filtered features
36. hub future weather indicators time filtered features
37. indicators time all features mean
38. hub weather time all features
39. hub all features mean
40. weather time all features
41. indicators time filtered features
42. control time
43. hub time all features
44. hub future time all features
45. weather filtered features
46. hub future weather indicators time all features
47. future filtered features
48. hub weather filtered features
49. hub weather all features
50. hub future filtered features
51. future all features
52. hub future all features
53. hub future weather indicators all features
54. weather all features
55. hub all features
56. indicators time all features

FIG. 15B

ANALYSIS AND CORRECTION OF SUPPLY CHAIN DESIGN THROUGH MACHINE LEARNING

CROSS-REFERENCE TO RELATED APPLICATIONS

This application is a continuation of U.S. Ser. No. 17/061,422 filed Oct. 1, 2020, which is a continuation of U.S. Ser. No. 16/223,938 filed Dec. 18, 2018, which is a continuation-in-part of U.S. Ser. No. 16/147,311 filed Sep. 28, 2018, both of which claim priority to U.S. Ser. No. 62/725,345 filed Aug. 31, 2018, all of which are hereby incorporated by reference in their entirety.

TECHNICAL FIELD

The present disclosure relates generally to supply chain management and more particularly to adjusting supply chain planning based on analysis of historical supply chain management performance and data related to weather and financial metrics.

BACKGROUND

In spite of technical advances, there is still a large gap between how a supply chain is designed and how it actually operates. A supply chain is a complex system, since it includes many interdependent components. A problem with a single component (e.g a chronic late supplier) or many—may result in repercussions throughout the supply chain, resulting in a loss of efficiency and revenue. Therefore, it is advantageous to accurately measure the actual capabilities of a supply chain, compare them with the original design, and make systematic corrections if necessary. In addition, it would be helpful to perform an in-depth analysis of the deviations from the original design, to identify root-causes of these discrepancies and thereby provide a long-term solution, thereby improving business metrics (e.g. revenue, customer satisfaction, overall inventory, etc.).

A number of publications discuss predictive analysis of business metrics based on analysis of historical data (including machine learning).

U.S. Pub No. 2008/0065436 A1 discloses methods, systems and computer program products for supporting supply chain facility performance analysis. The method comprises identification of variables related to the performance of supply chain facilities, and an analysis of the performance thereof using standard data envelope analysis, statistical analysis and sensitivity analysis. Performance rankings of the supply chain facilities are calculated, while a prescription for performance improvement is provided.

U.S. Pub. No. 2010/138264 A1 discloses a dynamic business enhancement system that provides a company access to its historic, current and future operational states. A dynamic data engine is used to create and display historic transactions, current stock levels and forecasted demand data in real-time. Attributes of original transactional data are configured and modified dynamically—which result in managed demand forecast, budget and purchasing information. Any change in the raw data due to a business transaction is immediately reflected in the demand forecast.

U.S. Pub. No 2018/0101814 A1 discloses dynamic supply chain management systems and methods that can compile and decompose historical order data to identify causality factors that produced variability in historical order lead times or till rates. These factors are applied to current orders to determine current order lead times and order fill rates.

U.S. Pat. No. 9,600,779 B2 discloses a machine learning classifier that includes a data set processing subsystem to generate a training set and a validation set from multiple data sources. The system further includes classifier hardware; a buffer connected to the classifier hardware; and a register connected to the classifier hardware. The classifier hardware induces a classifier according to the training set, and tests the classifier according to the validation set.

U.S. Pat. No. 6,611,726 B1 discloses a method for determining optimal time series forecasting parameters. The method includes choosing a dependent variable for which a value is to be forecast, gathering historical data on values of the dependent variable and associated variables in historical time periods, and determining a forecasting equation based on the historical data. The method further calculates a forecasted value of the dependent variable for a future time frame. It also calculates an error value by comparing the forecasted value with the historical data. The error value is then used to modify the forecasting equation to reduce the error value. As an example, the dependent variable may be product demand.

Berlec, T. et al disclose in their paper "Predicting Order Lead Times" (*J. of Mech. Eng.*, 54 (2008)5, 308-321), a procedure in which expected lead times of a company's planned orders are predicted based on the actual lead times of orders processed in the past. The procedure provides an empirical distribution of possible lead times for the new order, which is then used to predict the most probable lead time of a new order.

Lingitz, L. et al disclose in their paper "Lead time prediction using machine learning algorithms: a case study by a semiconductor manufacturer" (Science Direct, Procedia CIRP 72 (2018), 1051-1056), study of lead time prediction methods for semiconductor manufacturing. Supervised machine learning approaches are used for lead time prediction, based on historical production data obtained from manufacturing execution systems. Regression algorithms are examined for their effect on increasing accuracy of lead time prediction.

Lead time is an important supply chain metric which has a significant impact on inventory cost and late revenue in supply chains. Inaccurate lead time planning parameters can lead to significant supply chain inefficiency and cost overruns. Due to the large amounts and variability of data related to lead times, it is a challenge to detect and correct deviations in lead times used in the supply planning data, by conventional supply management tools. Nonetheless, such an analysis is important in order to enhance performance and efficiency of supply chain management.

SUMMARY

In accordance with an embodiment, a dynamic supply chain planning system comprising: a database comprising historical lead time data related to a supply chain, weather data and economic indicators data; and a machine learning server in communication with the database, the machine learning server comprising a machine teaming service and a data preparation module, wherein the data preparation module is in communication with the database to obtain the historical lead time data, the weather data and the economic indicators data; the data preparation module processes: the historical lead time data into a processed historical lead time dataset; the weather data into a processed weather dataset; and the economic indicators data into a processed economic indicators dataset, to provide a processed dataset for use by the machine learning service; the machine learning service comprises a forecasting module configured to forecast future lead times of the supply chain based on the processed dataset; and the machine learning server uploads the future lead times to the database.

In some embodiments, the historical lead time data comprises a plurality of data points, each data point comprising a source location, a destination location, a date of shipment and historical lead time; in preparation of the processed dataset, the data preparation module; extracts the plurality of source locations, destination locations and dates from the historical lead time data: extracts weather data from the weather database based on the source locations, destination locations and dates extracted from the historical lead time data; and extracts economic indicators data from the economic indicators database based on the source locations, destination locations and dates extracted from the historical lead time data.

In some embodiments, the data preparation module performs a correlational analysis of features within the extracted historical lead time data, the weather data and the economic indicators data.

In some embodiments, the weather data comprises at least one of ambient temperature, air pressure, humidity, wind speed, wind direction, precipitation and air quality; and the economic indicators data comprises data from the World Bank.

In some embodiments, the economic indicators data comprises data at least one of consumer durables, share prices, consumer price index, Gross Domestic Product, employment levels, retail sales, Gross National Product, interest rates, housing price index and real estate index.

In some embodiments, the forecasting module: divides the processed dataset into a first portion of data points and a second portion of data points, the first portion consisting of more than 50% of the data points, the second portion consisting of less than 50% of the data points; trains each of a plurality of machine learning forecasting algorithms on the first portion and subsequently tests each of the plurality of machine learning forecasting algorithms on the second portion; selects that forecasting machine learning algorithm that has a greatest accuracy in testing the second portion; and retrains the selected forecasting machine learning algorithm on the processed dataset.

In some embodiments, the first portion consists of 51%-80% of the data points, and the second portion consists of 20%-49% of the data points, such that the first and second portion total 100% of the data points.

In some embodiments, the plurality of machine learning algorithms comprises Adaboost Regressor, FB Prophet, linear regression, mean and median.

In some embodiments, the historical lead time data is over a period of two years.

In some embodiments, the forecasting module provides monthly future lead time data based on a monthly average of daily future lead time data.

In some embodiments, the system further comprises: an analytics module in communication with the database; and a user interface in communication with the analytics module; wherein the analytics module is configured to: receive from a user via the user interface, tolerance criteria for separation of the historical lead time data into a plurality of tolerance zones based on median absolute differences between actual lead time data and historical planned lead time data; and separate the historical lead time data into the plurality of tolerance zones; and wherein in relation to the forecasting module, the analytics module is configured to: obtain future lead times forecast by the forecasting module from the database; replace future planned lead times by the future lead times forecast by the forecasting module in accordance with an action criterion defined by the user for each tolerance zone.

In some embodiments, the analytics module forms part of a rapid response planning system that, prior to any up-to-date change in the historical lead time data: processes the tolerance zones; and replaces future planned lead times by the future lead times forecast by the forecasting module in accordance with the action criterion.

In accordance with another embodiment, a dynamic supply chain planning system comprising a processor operable to execute instructions stored in a memory; and the memory includes specific instructions for forecasting future lead times of a supply chain based on: historical lead time data of the supply chain; weather data; and economic indicators data; wherein execution of the specific instructions causes the processor to: receive the historical lead time data, the weather data and the economic indicators data from one or more databases; process the historical lead time data by removing outlier data; extract a plurality of source locations, destination locations and shipment dates from the historical lead time data; extract a subset of weather data from the weather data based on the source locations, the destination locations and the shipment dates; extract a subset of economic indicators data from the economic indicators data based on the source locations, the destination locations and the shipment dates; prepare a processed dataset based on the processed historical lead time data, the subset of weather data and the subset of economic indicators data, the data preparation module processes: the historical lead time data into a processed historical lead time dataset; divide the processed dataset into a first portion of data points and a second portion of data points, the first portion consisting of more than 50% of the data points, the second portion consisting of less than 50% of the data points; train each of a plurality of machine learning forecasting algorithms on the first portion and subsequently test each of the plurality of machine learning forecasting algorithms on the second portion; select that forecasting machine learning algorithm that has a greatest accuracy in testing the second portion; retrain the selected forecasting machine learning algorithm on the processed historical lead time data; use the selected forecasting machine learning algorithm to forecast future lead times of the supply chain; and upload the future lead times to the database.

In some embodiments of the system, the first portion consists of 51%-80% of the data points, and the second portion consists of 20%-49% of the data points, such that the first and second portion total 100% of the data points; and the plurality of machine learning algorithms comprises Adaboost Regressor, FB Prophet, linear regression, mean and median.

In some embodiments of the system, the historical lead time data is over a period of two years; and the future lead times are based on a monthly average of daily future lead time data.

In some embodiments of the system, the specific instructions further allow for: separation of the historical lead time into groups, and processing of the future lead times; wherein execution of the specific instructions causes the processor to: receive from a user, tolerance criteria for separation of the historical lead time data into a plurality of tolerance zones based on median absolute differences between actual lead time data and historical planned lead time data; prior to any up-to-date change in the historical lead time data, separate the historical lead time data into the plurality of tolerance zones; and prior to any up-to-date change in the historical lead time data, replace future planned lead times by the future lead times in accordance with an action criterion defined by the user for each tolerance zone.

In some embodiments of the system, the specific instructions further allow for preformation of a correlational analysis of features within the processed historical lead time data, the subset of weather data and the subset of economic indicators data.

In accordance with another embodiment, a computer-implemented method comprising: receiving: historical lead time data of a dynamic supply chain planning system; weather data; and economic indicators data from one or more databases; processing the historical lead time data by removing outlier data; extracting a plurality of source locations, destination locations and shipment dates from the historical lead time data; extracting a subset of weather data from the weather data based on the source locations, the destination locations and the shipment dates; extracting a subset of economic indicators data from the economic indicators data based on the source locations, the destination locations and the shipment dates; preparing a processed dataset based on the processed historical lead time data, the subset of weather data and the subset of economic indicators data; accessing a machine learning forecasting module; when accessing the machine learning forecasting module: dividing the processed dataset into a first portion of data points and a second portion of data points, the first portion consisting of more than 50% of the data points, the second portion consisting of less than 50% of the data points; training each of a plurality of machine learning forecasting algorithms on the first portion and subsequently test each of the plurality of machine learning forecasting algorithms on the second portion; selecting that forecasting machine learning algorithm that has a greatest accuracy in testing the second portion, retraining the selected forecasting machine learning algorithm on the processed historical lead time data; using the selected forecasting machine learning algorithm to forecast future lead times of the supply chain; and uploading the future lead times to the database.

In some embodiments of the method, the dynamic supply chain planning system is a rapid response planning system, and the method further comprises: receiving from a user via a user interface, tolerance criteria for separation of the historical lead time data into a plurality of tolerance zones based on median absolute differences between actual lead time data and historical planned lead time data; prior to any up-to-date change in the historical lead time data, separating the historical lead time data into the plurality of tolerance zones, and prior to any up-to-date change in the historical lead time data, replacing future planned lead times by the future lead times in accordance with an action criterion defined by the user for each tolerance zone.

In some embodiments of the method, the dynamic supply chain planning system is a rapid response planning system, and the method further comprises: receiving from a user via a user interface, tolerance criteria for separation of the historical lead time data into a plurality of tolerance zones based on median absolute differences between actual lead time data and historical planned lead time data; prior to any up-to-date change in the historical lead time data, separating the historical lead time data into the plurality of tolerance zones; and prior to any up-to-date change in the historical lead time data, replacing future planned lead times by the future lead times in accordance with an action criterion defined by the user for each tolerance zone.

In some embodiments of the method, the first portion consists of 51%-80% of the data points, and the second portion consists of 20%-49% of the data points, such that the first and second portion total 100% of the data points; and the plurality of machine learning algorithms comprises Adaboost Regressor, FB Prophet, linear regression, mean and median.

The term "rapid response" is defined further below.

The foregoing and additional aspects and embodiments of the present disclosure will be apparent to those of ordinary skill in the an in view of the detailed description of various embodiments and/or aspects, which is made with reference to the drawings, a brief description of which is provided next.

BRIEF DESCRIPTION OF DRAWINGS

Embodiments may be more completely understood in consideration of the following detailed description of various embodiments in connection with the accompanying drawings, in which.

DETAILED DESCRIPTION

A supply chain can be defined as a sequence of processes and/or events in the production and distribution of a product.

A supply chain can include information about equipment, raw materials, parts, components, organizations, people, locations, modes of transport and resources used to produce a product and move the product from a manufacturer or supplier to a customer Many factors can influence the supply chain at a variety of different points in the chain, and these factors are often unpredictable.

One metric that provides insight into the behaviour of a supply chain is lead time Other metrics in the supply chain can also provide insight. One definition of lead time is the time between the start and the completion of production process. For example, if it takes five days to ship a bicycle from Montreal to Vancouver once an order is received, the lead time of the bicycle shipment from Montreal to Vancouver is 5 days.

Figure 1:
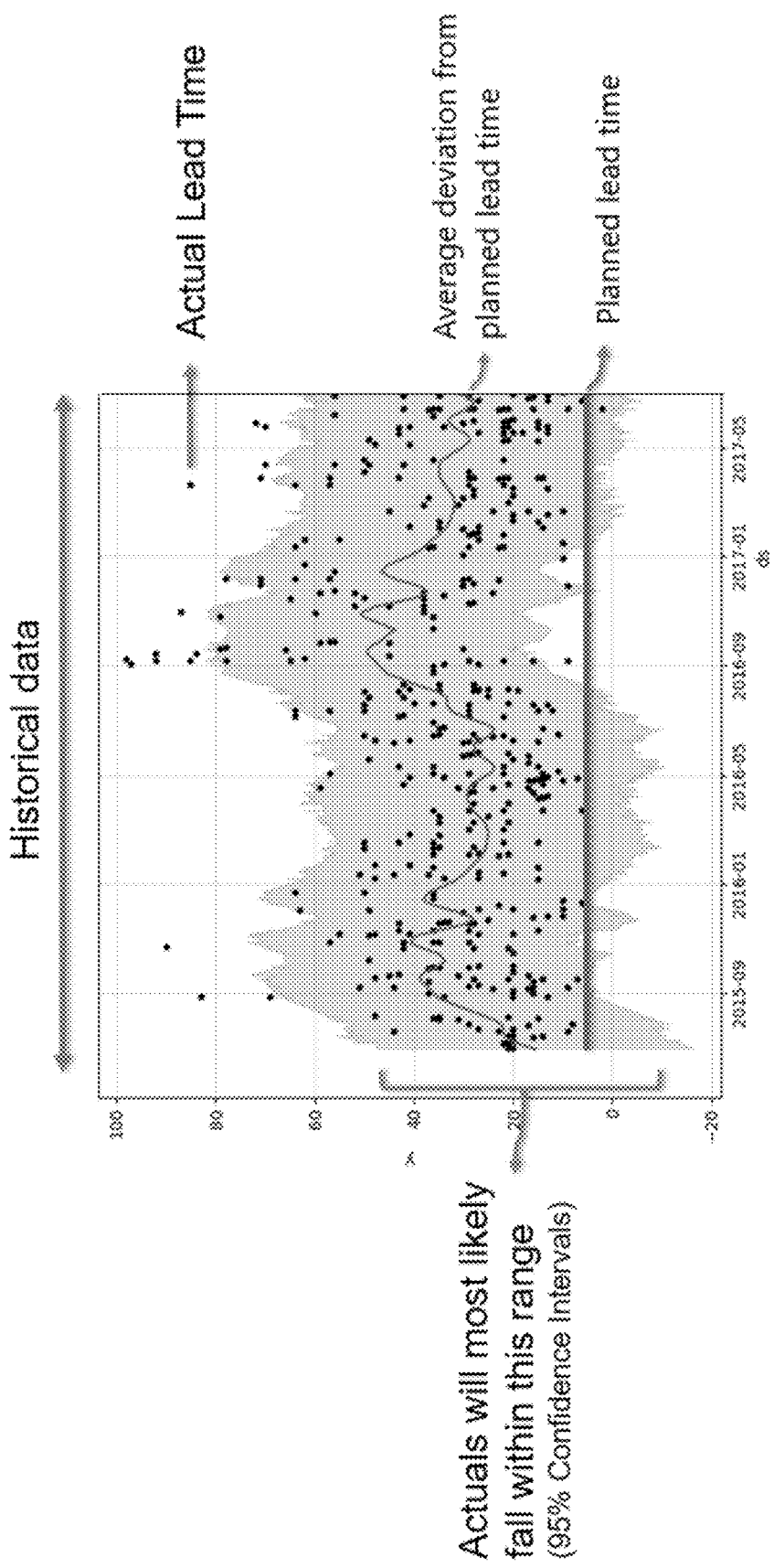
FIG. 1 illustrates planned lead time vs. actual lead time over a 2-year period.

A supply chain can have hundreds of thousands—if not millions—of lead time data points over a period of time. In supply chain management, lead times are often designed (or planned). The actual lead time data are often different from the planned lead times, as shown in FIG. 1 in which the planned and actual lead times (in units of days) are shown for a period of 2 years (from July 2015 to July 2017). The solid line indicates that the planned lead time in the design of the supply chain was 5 days. However, the actual lead time data (indicated by the data points) rarely matched the planned lead time. The average deviation (between the planned and actual lead times) is shown as well and varies between 15 days (minimum) to 50 days (maximum), with the average being around 30 days.

This analysis shows the clear discrepancy between how the supply chain was designed to operate (between July 2015-July 2017) and how it actually operated during that time. Serious consequences can arise between such large discrepancies. For example, if a 5-day lead time is used to estimate when to purchase or manufacture new supplies—when in actuality, the lead time is 30 days then there will be a chronic shortage of materials downstream the chain. The supply shortages invariably lead to additional costs to expedite supplies, and also lead to later deliveries to customers, thereby increasing costs and reducing revenue.

In an embodiment, the historical lead time data is analyzed using machine learning algorithms that can forecast lead times and provide a cluster analysis of the historical lead time data to ascertain factors that are contributing towards deviations.

In the present disclosure embodiments are provided to identify, categorize, and visualize variability in historical lead times. In addition, machine learning algorithms can be used to predict lead times, and if necessary, adjust planned lead times. Furthermore, parts with similar patterns of lead time deviation may be clustered into the same group with the use of machine learning algorithms. The clustering can help a planner to visually identify similar problems in lead times of purchase orders. As such, the deviations of lead times for future purchase orders can be adjusted automatically or based on manual review. Furthermore, business metrics before and after adjusting lead times may be projected in order to compare the impact of accepting the lead time recommendations provided by the machine learning algorithm.

Figure 2A:
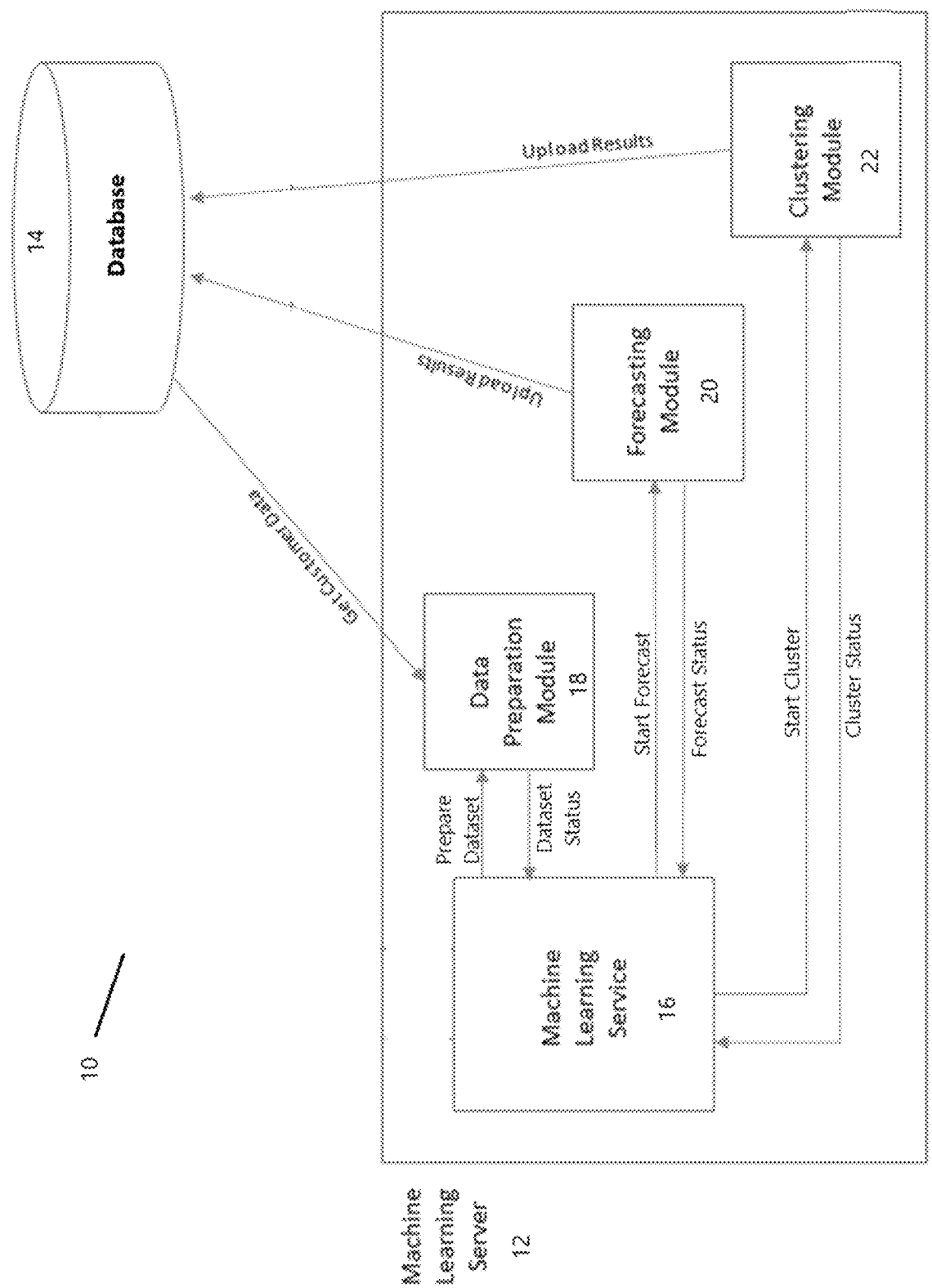
FIG. 2A illustrates system architecture of an embodiment of application of machine learning for analysis and correction of supply chain design.

FIG. 2A illustrates system architecture (10) of an embodiment of application of machine learning for analysis and correction of supply chain design. A machine learning server (12) is in communication with a database (14) that contains data related to supply chain planning, including historical lead times. The machine learning server comprises a machine learning service (16) that comprises a data preparation module (18), a forecasting module (20) and a clustering module (22), each of which are in communication with the database (14). The machine learning service (16) first initiates preparation of the dataset prior to analysis by the forecasting and clustering modules (20, 22). As such, the data preparation module (18) obtains data from the database (14), and then performs data preparation (described below) on the dataset. The dataset status is communicated to the machine learning service (16).

Once the dataset status is complete, the machine learning service (16) initiates a forecasting analysis (based on the prepared dataset) via the forecasting module (20), which then communicates the forecast status to the machine learning service (16). Once the forecast status is complete, the forecasting module (20) uploads the forecast results to the database (14).

Once the dataset status is complete, the machine learning service (16) also initiates a clustering analysis (based on the prepared dataset) via the clustering module (22), which then communicates the cluster status to the machine learning service (16). Once the cluster status is complete, the clustering module (22) uploads the cluster results to the database (14).

The forecasting analysis and clustering analysis may be performed in parallel. They may also be performed sequentially, with either clustering or forecasting analysis performed first.

The forecast results and clustering results, once uploaded to the database (14), may be used for further analysis and planning by a supply chain planning platform.

The database (14) may be incorporated into a separate supply chain planning platform server; or may be standalone in a separate server; or may be incorporated into the machine learning server (12).

Figure 2B:
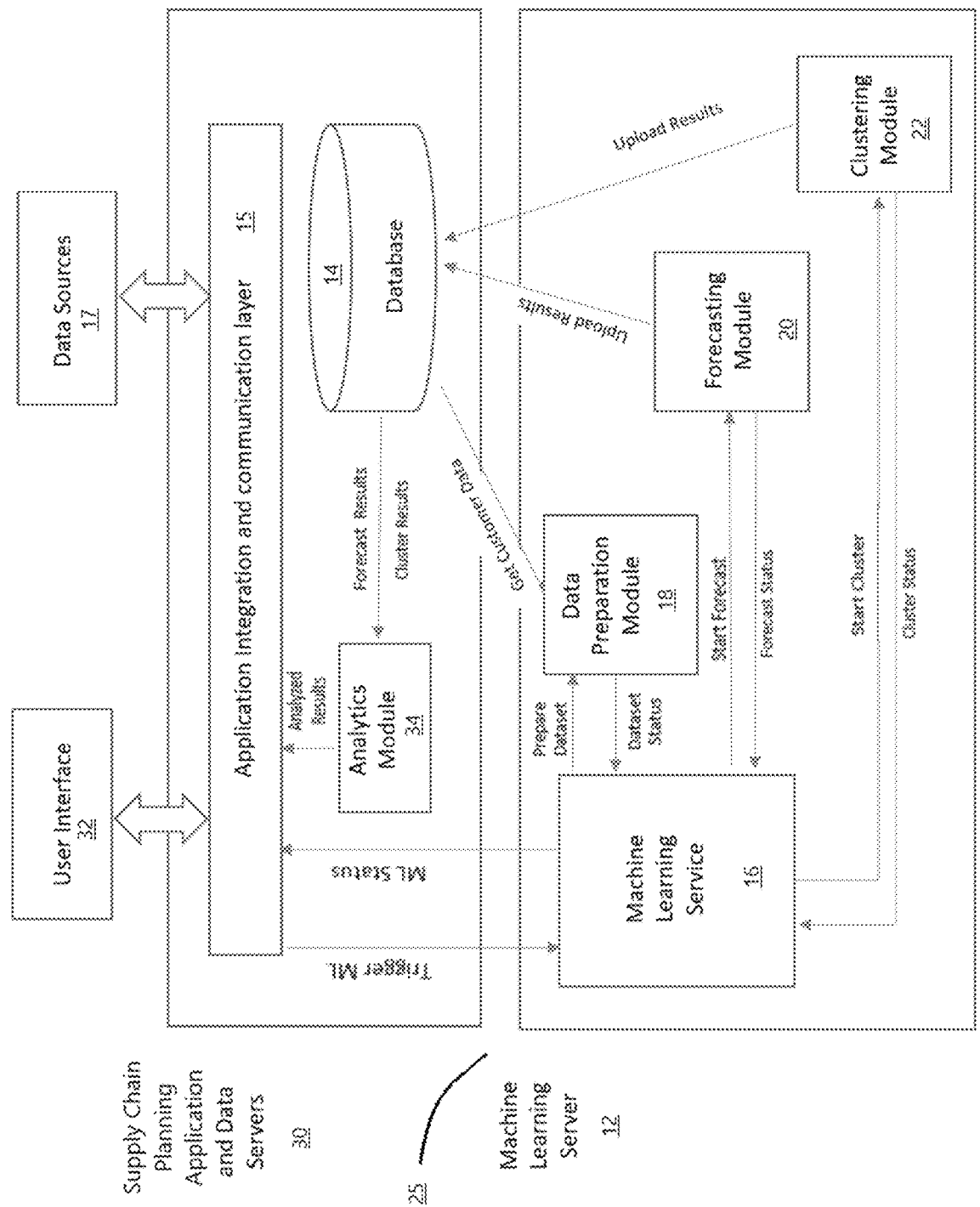
FIG. 2B illustrates system architecture of the embodiment shown in FIG. 2A integrated with a supply chain planning platform.

FIG. 2B illustrates a system architecture 25 of an embodiment which may be implemented as software (e.g., machine-executable instructions) stored on a non-transitory computer readable medium and executed by one or more processors. The architecture 25 may represent a software architecture that is implemented on computing hardware. As an example, FIG. 2B illustrates system architecture of the embodiment shown in FIG. 2A, integrated with a supply chain planning platform. The numerical references for components common between FIGS. 2A and 2B are identical.

A machine learning server (12) is integrated with a supply chain planning platform that comprises a supply chain planning application and data servers (30). The Machine learning service (16) may be triggered via a user interface (32) that is part of the supply chain planning platform. Once triggered, the machine learning service operates with the data preparation module (18), forecasting module (20) and clustering module (22), as described above (with reference to FIG. 2A). The forecasting results and clustering results are uploaded onto the database (14); then communicated to an analytics module (34), which then communicates the analyzed results to a user via the user interface (32).

The architecture 25 includes an application service integration and communication layer 15 that supports data collection from the data sources 17, and optionally other systems and applications (not shown). The layer 15 may also provide secure access with a user interface 32, which may allow users to log into the supply chain planning platform 30 to view data or perform other operations. The layer 15 may utilize a full featured web services library to provide a connection for the user interface 15 to the platform 30. Generally, the layer 15 provides a mechanism for interfacing with the different systems and web interfaces. The layer 15 may include APIs to communicate with the data sources 17 and other systems and applications (not shown). For example, the layer 15 receives data from the data sources 17.

An example of a supply chain planning platform that may be integrated with the machine learning server (12) is one that provides rapid processing of business metrics and scenario simulations. That is, processing of the historical lead time data, and processing of the machine learning results (i.e. forecasting future lead times, clustering of historical lead times) is performed such that machine learning results are up-to-date (i.e. there is no further changes in the historical lead time data while results involving hundreds of thousands, even millions of data points, are being processed). An example of a supply chain planning platform that provides rapid processing of business metrics and scenario simulations is disclosed in U.S. Pat. Nos. 7,610,212 B2; 8,015,044 B2; 9,292,573 B2; and U S Pub. No. 20130080200A1 all of which are incorporated herein by reference. Such a "rapid" platform is heretofore referred to as a "rapid response" supply chain planning platform.

System 25 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure. In embodiments, the system or components thereof can comprise or include various modules, each of which is constructed, programmed, configured, or otherwise adapted to autonomously carry out a function or set of functions.

Figure 3:
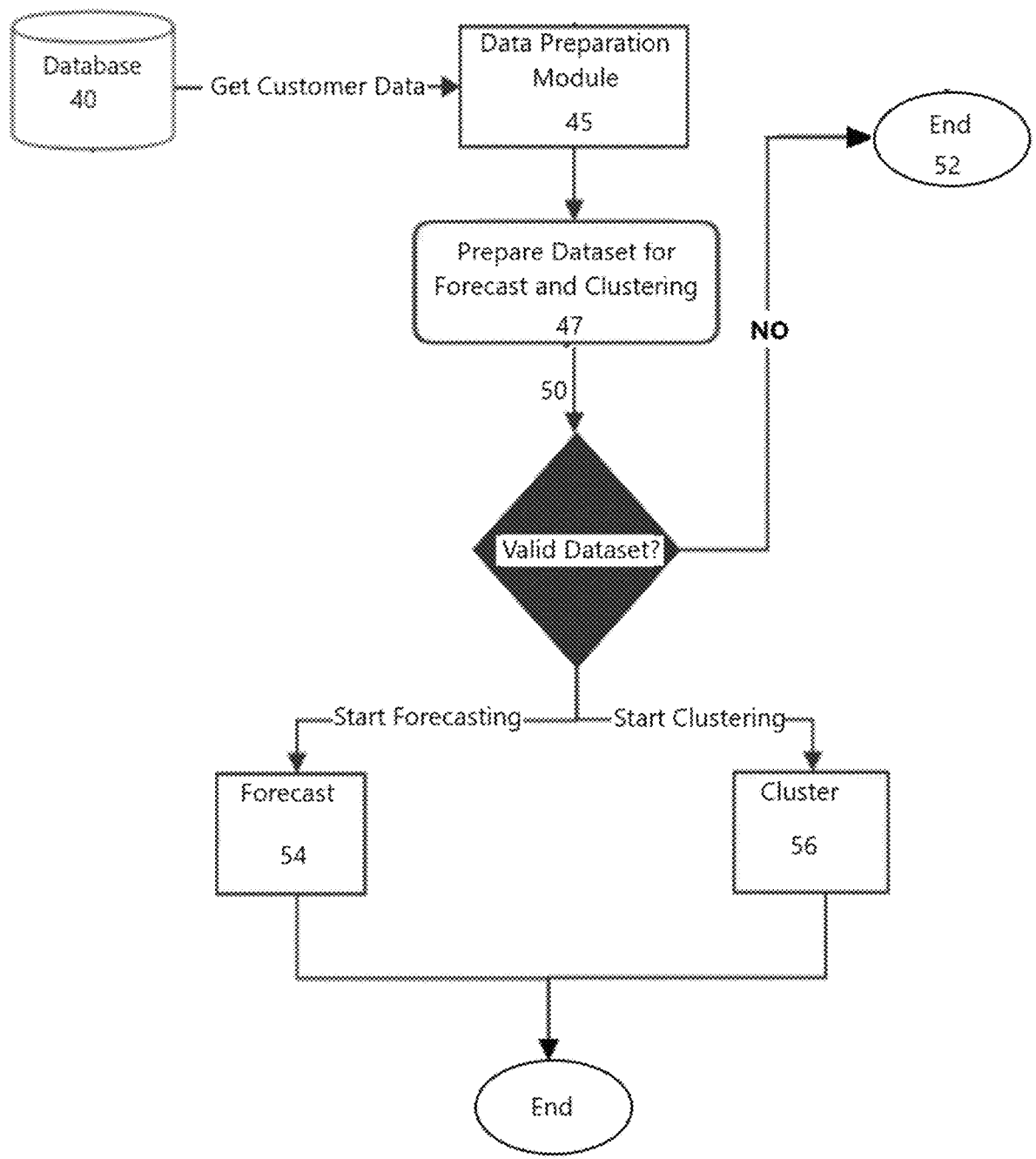
FIG. 3 illustrates a flow chart of an embodiment of applying machine learning to supply chain data.

FIG. 3 illustrates a flow chart of an embodiment of applying machine learning to supply chain planning data. A supply chain planning database (40) may include historical data for a supply chain management system of a customer over a period of time. This can include supply chain planning data related to historical actual orders placed against suppliers on a given date (such as information about a lead times, order dates, quantities, unit prices, the source that provided the part, etc.), information about a unique part and site (such as the part name, description, price and cost data, etc.), and information pertaining to contact people at suppliers (such as information about the contact person for the source, the supplier ID, the source ID, the transportation mode, etc.).

The raw data is then prepared for machine learning (47) via a data preparation module (45). Prior to sending the prepared dataset for use by machine learning algorithms, the prepared dataset can proceed through a final check (50) to make sure that there is a valid dataset for the machine learning application. For example, in the process of preparing the dataset for machine learning, it may be that the prepared dataset does not contain enough points for analysis—at which point the process ends (52). Where the prepared dataset is valid, two machine learning algorithms may be applied in parallel to forecast (54) important supply chain attributes such as lead times, and preform a cluster analysis (56) on the historical data to determine similar patterns/characteristics. The two applications of machine learning may be performed in parallel, or sequentially. In addition, while two types of machine learning applications (i.e. forecasting and clustering) are illustrated, fewer (i.e. one) or more machine learning applications may be performed.

Figure 4:
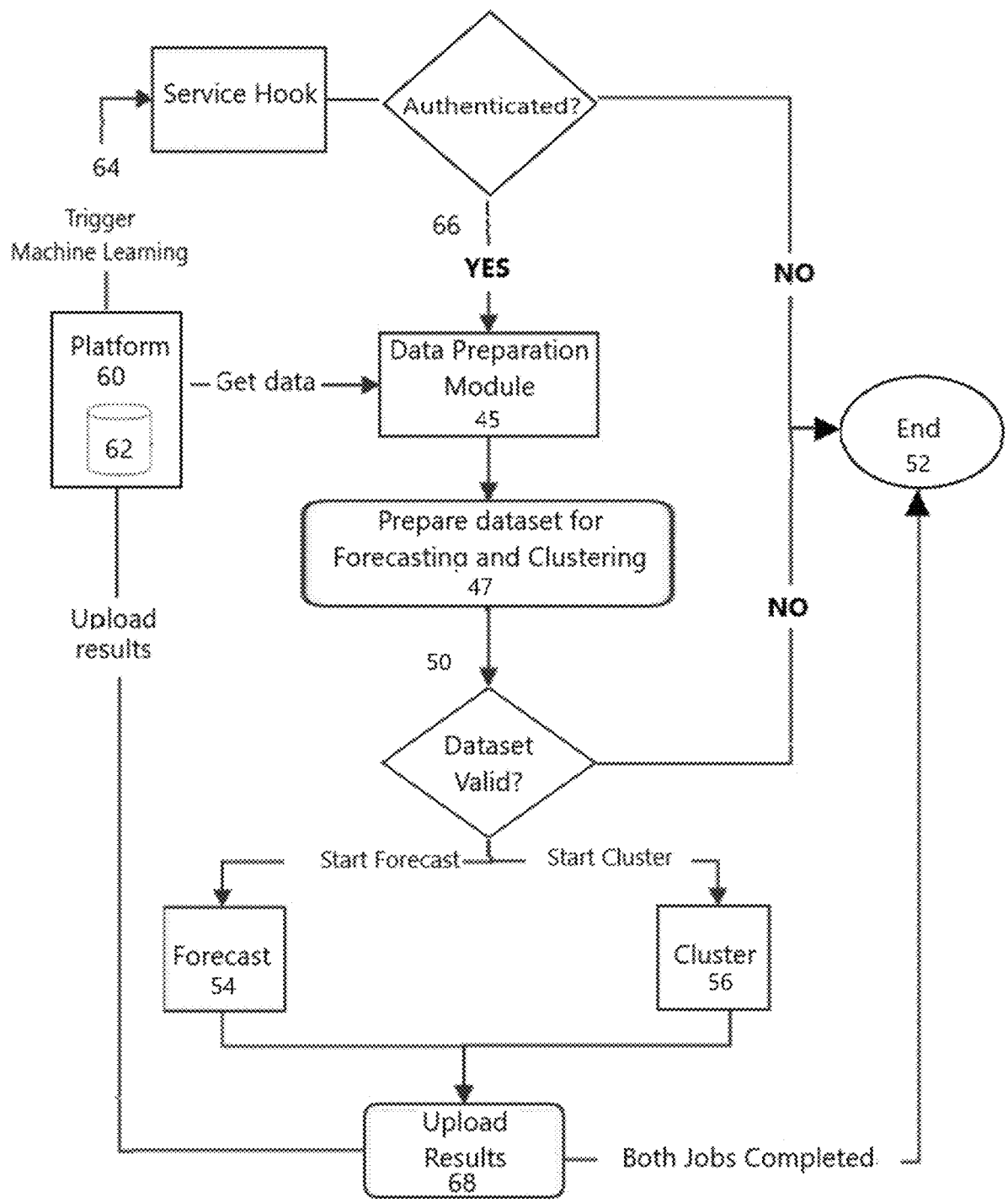
FIG. 4 illustrates a flow chart of an integration of the embodiment shown in FIG. 3 with a supply chain planning platform.

The process shown in FIG. 3 may form a component of a larger supply chain planning platform, as shown in FIG. 4 which illustrates a flow chart of an integration of the embodiment shown in FIG. 3 with a supply chain planning platform (60). Here, a supply chain planning platform (60) can include data (62) related to the design of a customer's supply chain, as well as means/schedules for updating the data. For example, a customer may request analysis and update of an existing design via machine learning on a monthly or quarterly basis (or some other regular period). The scheduling can trigger (64) the machine learning process, which initiates the machine learning service prior to authentication of customer information. Once customer information is authenticated (66), the process illustrated in FIG. 3 goes into effect, with the machine learning results (68) returned to the supply chain planning platform (60) for further application and analysis.

Preparation of Data for Machine Learning

Figure 5:
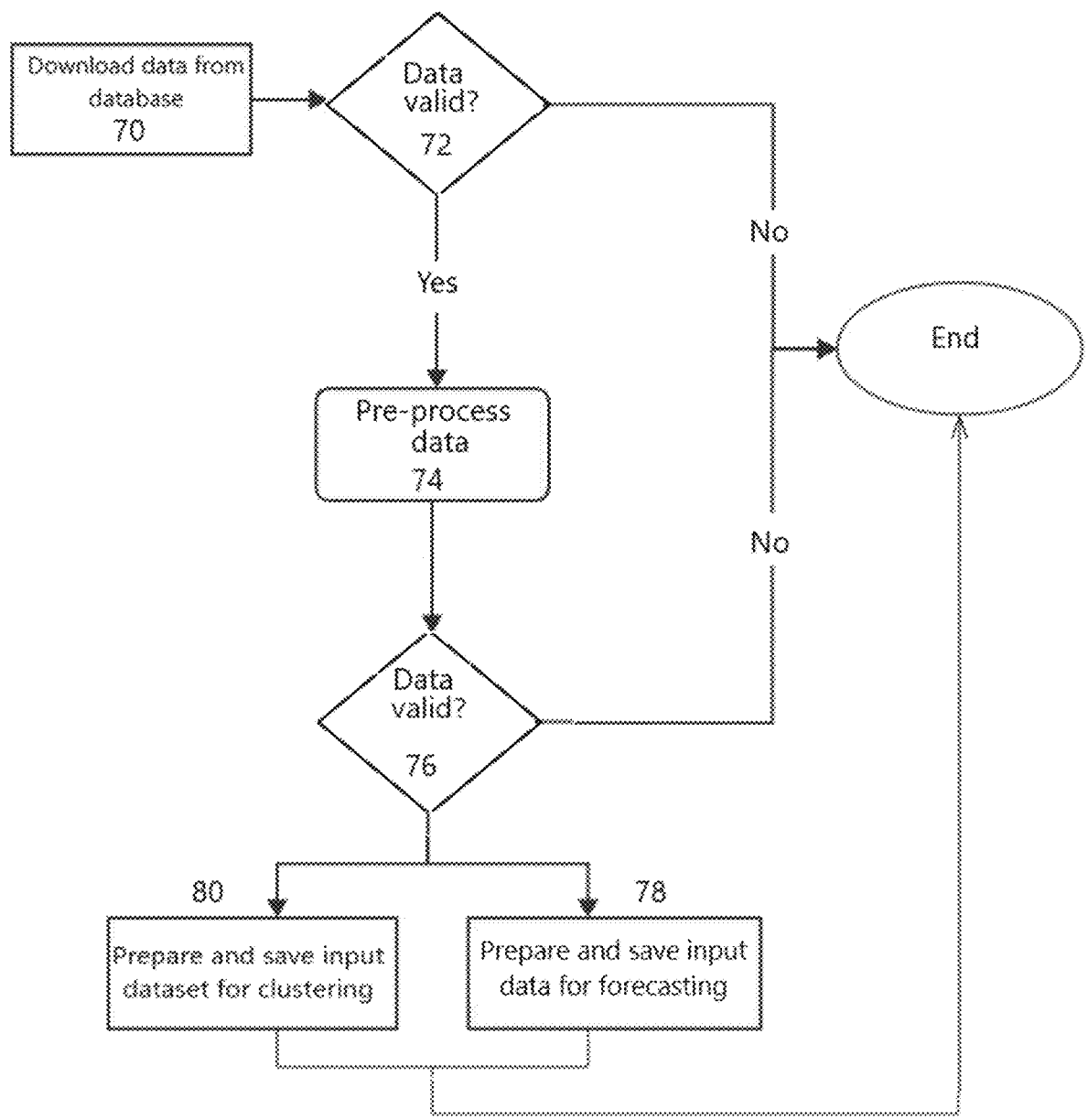
FIG. 5 illustrates a flow chart of a data preparation module in FIGS. 3 and 4.

FIG. 5 illustrates a flow chart of a data preparation module in FIGS. 3 and 4. When the historical data is downloaded (70) from the database, it is first checked (72) to make sure there is valid data. It can then be pre-processed (74) (e.g. cleaned up, as described below), and then checked once again (76) to make sure there is a valid dataset for machine learning. If the processed dataset is valid, it may then be formatted into a format appropriate for forecasting and clustering, respectively (78, 80).

In some embodiments, lead time data is obtained from the historical supply actual data in the customer's enterprise data source(s). The historical lead time data can be data over a period of time. To enhance accuracy Forecast and Cluster results, a minimum of 2 years (24 months) worth of historical data can be used. As an example (as shown in FIG. 1), a 2-year time period may be used although other time periods may be used (for example 1-year, 15 months, 18 months, 21 months, 27 months, 30 months, 33 months, 36 months, or longer).

Before analysis by machine learning, the data may be "cleansed" to remove data errors and outliers. Examples of data errors may include records with null values, duplicate records, negative lead times, etc.

As for outliers, an outlier is a data point with a lead time that can lie outside an overall pattern of a time series. As an example of identification of outliers, the interquartile range (IQR) may be used (other statistical methods may also be used to calculate outliers). In the IQR method, a data point is an outlier if it is, for example, more than 1.5 times the IQR above the third quartile (Q3); or if it is, for example, less than 1.5 times the IQR in the first quartile (Q1). This can be expressed mathematically; a data point (DP) is an outlier if.

$$DP < Q1 - 1.5 * IQR \text{ or } DP > Q3 + 1.5 * Q3$$

The IQR method, as defined above, includes the following steps:
1. Calculates the median, the quartiles, and the IQR.
2. Calculates 1.5*IQR below the first quartile to check for low outliers.
3. Calculates 1.5*IQR above the third quartile to check for high outliers.

The calculations result in an upper and lower bound. Any records with lead times that are below the lower bound and above the upper bound are removed from the data set prior to input to the machine learning algorithms.

Example of Calculating Outliers

For example, assume the following historical actual lead times in the data:

| January | February | March | April | May | June | July |
|---|---|---|---|---|---|---|
| 5 | 11 | 12 | 12 | 12 | 13 | 25 |

1. Calculating the median, the quartiles, and the IQR:
   a. The median is 12.
   b. The quartiles are calculated by dividing the ordered data set into two halves. For an odd number of data points in the full data set, the median is included in both halves. The lower quartile value is the median of the lower half of the data. The upper quartile value is the median of the upper half of the data.
   c. First quartile (also known as the 25th percentile or Q)=11.5 (this is obtained by calculating the median of the numbers 5, 11, 12, 12).
   d. Second quartile (also known as the 50th percentile or Q2)=12=Median
   e. Third quartile (also known as the 75th percentile or Q3)=12.5 (this is obtained by calculating the median of the numbers 12, 12, 13, 25).
   f. IQR=Q3−Q1=12.5−11.5=1
2. Calculating 1.5*IQR below the first quartile to check for low outliers:

$$Q1-1.5 \times IQR = 11.5-(1.5)(1)=10$$

Thus, a data point is considered a low outlier if less than 10. In this case, 5 is considered a low outlier.

3. Calculating 1.5*IQR above the third quartile to check for high outliers:

$$Q3+1.5 \times IQR = 12.5+(1.5)(1)=14$$

Thus, a data point is considered a high outlier if greater than 14. In this case, 25 is considered a high outlier.

Based on the IQR calculations above, there are two outliers (5 and 25) in the example data set. Therefore, those two data points are removed prior to input into the machine learning algorithm.

Finally, the processed data set is prepared in a format that can be used by the Forecasting and Cluster algorithms.

Forecasting

Once the data is processed, it is ready to be used by a machine learning algorithm to forecast future lead times based on the actual historical lead time data.

Figure 6:
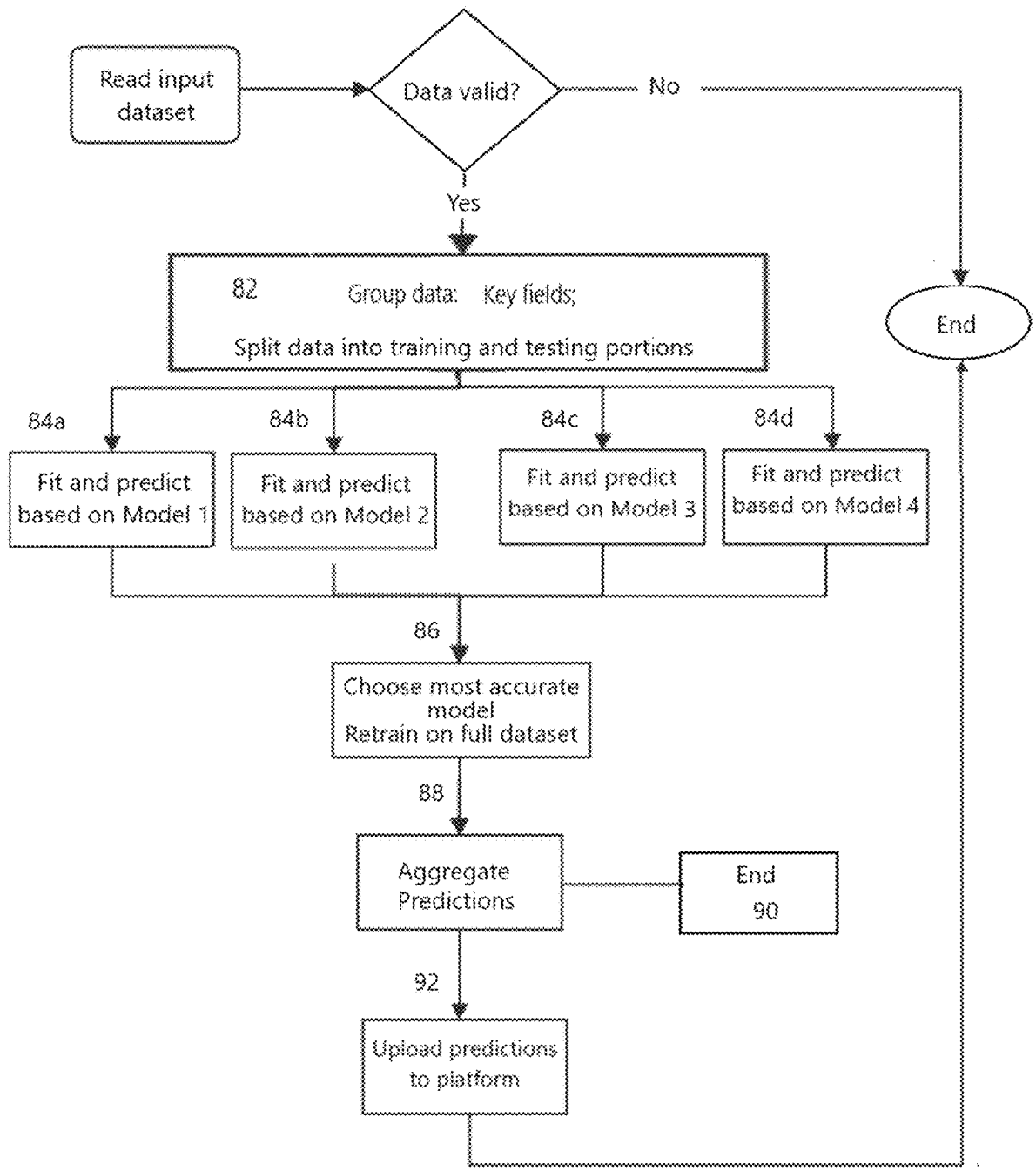
FIG. 6 illustrates a flow chart of the Forecasting component of FIG. 3.

FIG. 6 illustrates a flow chart of the Forecasting component of FIG. 3. Once the data is processed by the data preparation module, it is ready for the forecasting machine learning process. First the data can be grouped by key fields (82) (for example, a customer ID, a parts ID, etc.). The data is also grouped into a first portion (called a training portion) and second portion (called a testing portion). Then, a plurality of forecasting machine learning algorithms are each trained on the training portion; the forecasting of each is tested on the testing portion. In FIG. 6, four algorithms (84a, 84b, 84c, 84d) are trained and tested. However, fewer or more algorithms may be used for training and testing. The most accurate model (86) is then selected and retrained on the full historical dataset. It is then used to predict (or forecast) (88) lead times for a future period (for example, 3-6 months; 6-12 months, 1-2 years, etc.). The process can then end (90). Alternatively, if the machine learning process is part of a supply chain planning platform (as in FIG. 4), the results are uploaded (92) to the platform for further analysis/use.

Aspects of FIG. 6 are described in further detail below.

The forecast machine learning algorithm can predict the lead time of purchased items (or parts) from different suppliers at different times of the year. Each item may exhibit a different behavior in terms of lead time due to many factors including: its varying demand over the year, the geographical location of suppliers producing the item, price and availability of the item, quantity of orders, etc. This results in many scientific uncertainties since each forecasting algorithm may work well in some situations. As such, no single forecasting machine algorithm works best for all the data—the choice of the algorithm is data-dependent. Multiple forecasting machine algorithms may be tested on the data to see which work reasonably well.

Conventional approaches train forecasting machine algorithms offline and deploy a fixed forecasting model. However, such an approach may not fit well with the evolving nature of the historical lead time data or storage requirements needed when the machine learning algorithm is integrated with a supply chain planning platform in which data is constantly being updated. A transient-model methodology may be used where a model can be trained with "live" data and used to forecast lead times for a time period (e.g. three months, six months, twelve months, etc.) into the future, while forgetting about the model after runtime (i.e. retraining the model). Furthermore, as processing time must be reasonable (e.g. not more than 1-2 weeks), different forecasting machine algorithms can be evaluated for performance in terms of computational complexity/forecast quality for different datasets.

Since over-fitting is one of the critical challenges in machine learning, a trained model cannot generalize the historical data to predicted data. As such, the historical data can be divided into a set for training a forecasting machine learning algorithm, and a test set to validate the algorithm. Assuming that the future data follows a similar distribution as historical data, a model is validated on the test set to decide which algorithm and parameters to use for prediction of future data. This helps to reduce the risk of over-fitting to the historical data.

The forecasting machine learning algorithm may be first trained before it is used to forecast. As discussed above, due to the variability of the historical lead time data, a plurality of machine learning algorithms may be independently trained on a portion of the data. For example, if 2 years of data is provided, each forecasting machine learning algorithm may be trained on 70% of the data (i.e. approximately the first 17 months). Example of forecasting machine learning algorithms include Adaboost Regressor, FBProphet, linear regression, mean and median.

In some scenarios, the performance of an algorithm may be inadequate. As such, algorithm configuration parameters can be adapted to the data. For example, as sparse data adversely affects the "seasonality" feature of the FBProphet algorithm, a mechanism was developed to decide when this feature should be enabled. Furthermore, a number of experiments were attempted with different time-grouping strategies—which led to the conclusion that grouping the results after the forecast instead of before the forecast, may offer the best results. Despite running five models in parallel, at runtime, the computational complexity of the design met time completion requirements.

Once trained, each forecasting machine learning algorithm may be tested on the remaining 30% of the historical data. The lead times predicted by each forecasting machine learning algorithm are then compared to the historical lead times for the remaining 30% of the time period. The forecasting machine learning algorithm which proves to be the most accurate in predicting the remaining 30% of the data, is selected as the forecasting machine learning algorithm that will be used to forecast future lead times.

While the training and testing portions can be divided into 70%-30% portions, other portions are possible. For example the training portion may be 50%, while the testing portion may be the remaining 50%; or the training portion may be 60%, while the testing portion may be 40%; the training portion may be 75%, while the testing portion may be 25%. Any combination is possible, so long as the training portion is 50% or greater of the historical data, and the testing portion is 50% or less of the historical data.

As an example, for each of the five forecast machine algorithms that were being tested, it was hypothesized that most of the listed parameters (of each algorithm) should have a negligible effect on the quality of final forecasting. Experiments were performed to determine the importance of each parameter in the model quality. Finally, a few parameters were chosen for each of the algorithms and a grid search was performed on those parameters on the historical data.

In addition, experiments were designed to understand the effect of seasonality in the forecast quality. It was found out that modeling seasonality based on few observations and incomplete data may degrade the quality of forecasting. As such, precautionary steps were added to check whether a historical lead time data for a particular supply part is suitable for seasonality analysis.

The selected forecasting machine learning algorithm is first retrained on the full data set (i.e. the full 2 years), and then used to forecast lead times for a future time period. The future time period may be, for example, 0-24 months, or 3-15 months, or 12 months. For example, the future lead times can be provided for 3 months, 6 months, 9 months, 12 months, etc., from the date of running the forecasting machine algorithm.

Regarding the granularity of predictions, experiments were designed to compare the results of a monthly forecast with a daily forecast. While both monthly and daily forecasts provide useful information, predicting on a daily basis and aggregating all predictions of a month can provide better results than predicting any single point in a month (e.g. start, middle, or end).

In summary, a forecasting methodology was developed that can be successfully applied to any time series (of lead times) provided by a client, including sparse data sets. The methodology can use a plurality of machine learning algorithms (i.e. Adaboost Regressor, FBProphet, linear regression, mean, median) to assess performance on historical data and provide the best solution on future data. Further, certain algorithm parameters (e.g. seasonality) can be adapted dynamically to each dataset. The strength of the algorithm is that the assessment of the performance of each algorithm and their configuration is done at runtime which provides the flexibility to adapt to each dataset. Additionally, it was determined that grouping time-periods after forecasting can provide improved results.

Figure 7:
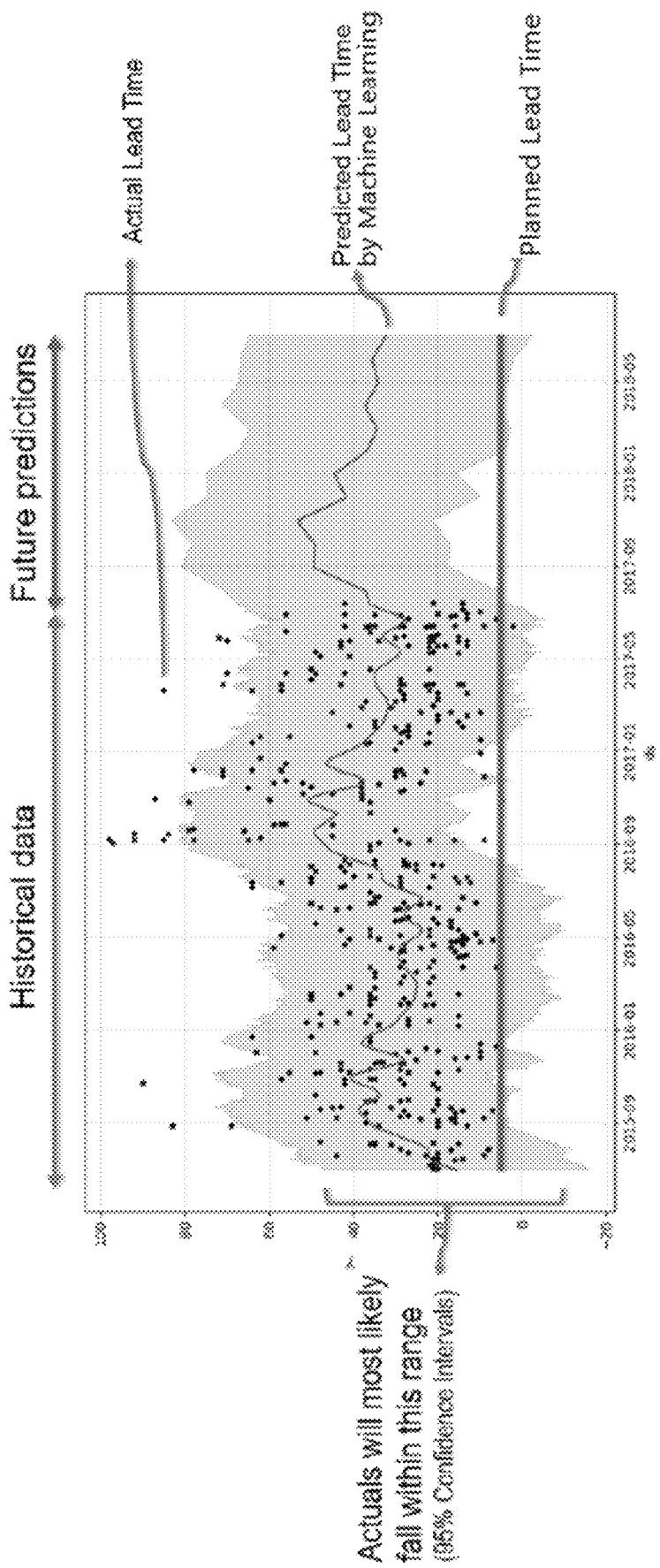
FIG. 7 illustrates 12-month forecasting using machine learning, based on the data shown in FIG. 1.

As an example, the historical lead time data shown in FIG. 1 was used to train a machine learning algorithm, which was then used to forecast future lead times. The resulting forecast of future lead times is shown in FIG. 7—for the 12 month period of July 2017 to July 2018. The predicted lead times vary from a low of about 35 days to a high of about 50 days—well above the planned lead time of 5 days. This information can be used to redesign the planned lead time to more accurately reflect the actual performance. Or it can be used to further investigate the source (or sources) of the average deviation from the planned deviation in the historical data set, and apply corrections to bring the actual lead times down closer to the planned lead times.

Use of Forecasting Results

The predicted lead times may be used to modify the design of the supply chain. Where the supply chain planning platform provides for rapid processing of hundreds of thousands of time series (i.e. the "Rapid response" platform defined above), a supply chain planner can set thresholds in the mean absolute deviation between planned and historical lead times for each time series, leading to "tolerance" zones for each time series. The planner can then use the machine learning forecasting results of lead times (that are uploaded onto the platform) in a rapid forecasting scenario of the "Rapid Response" platform to see if the scheduled lead times should be ignored or accepted.

For example, if a planner is tuning the lead times for a shipment of automobiles, s/he can define an "inside" tolerance threshold of 0-2 days (i e. lead times in this zone do not have to be altered); a "near" tolerance threshold of 2-6 days (i.e. lead times in this zone may be automatically updated or may require further review by the planner); and a "outside" tolerance threshold of 6 days or more (i.e. lead times in this zone may have to be changed, but require review from a planner). The lead time zone thresholds and their actions can be changed depending on the product and can be set based on days or percentage. For example, the following tolerance thresholds can be set for another product such as a bicycle:

| Tolerance zone | Tolerance threshold | Definition |
| --- | --- | --- |
| Near tolerance | 5 | The mean absolute deviation is in between 5 and 9 days |
| Outside tolerance | 10 | The mean absolute deviation is 10 days or more |

Where the mean absolute deviation is less than 5 days, the tolerance zone is defined as "Inside tolerance". Where the mean absolute deviation is between 5-9 days, the tolerance zone is defined as "Near tolerance". Where the mean absolute deviation more than 10 days, the tolerance zone is defined as "Outside tolerance".

The following three examples (Tables 1-3) each illustrate a time series in which the planned lead time is compared to the actual lead time (for a number of time periods); the mean absolute deviation of each is calculated, and then categorized within one of the three tolerance zones.

TABLE 1

| | Period 1 | Period 2 | Period 3 | Period 4 | Period 5 |
| --- | --- | --- | --- | --- | --- |
| Fixed lead time | 12 | 12 | 12 | 12 | 12 |
| Actual lead time | 8 | 8 | 8 | 8 | 8 |
| Difference | −4 | −4 | −4 | −4 | −4 |
| Absolute difference | 4 | 4 | 4 | 4 | 4 |

Here, the mean absolute deviation is (4 days×5)/5=4 days. Based on the tolerance threshold settings defined above, the absolute mean lead time deviation for this time series is categorized as "inside tolerance". As such, machine-learning forecasting results for this time series can be ignored, since the deviation is within an acceptable tolerance level.

TABLE 2

|                    | Period 1 | Period 2 | Period 3 | Period 4 | Period 5 |
|--------------------|----------|----------|----------|----------|----------|
| Fixed lead time    | 12       | 12       | 12       | 12       | 12       |
| Actual lead time   | 6        | 6        | 20       | 18       | 18       |
| Difference         | −6       | −6       | 8        | 6        | 6        |
| Absolute difference| 6        | 6        | 8        | 6        | 6        |

Here, the mean absolute deviation is (6+6+8+6+6) days/5=6.4 days. Based on the tolerance threshold settings defined above, the absolute mean lead time deviation for this time series is between 5 and 9 days and is thus categorized as "near tolerance". As such, machine-learning forecasting results for this time series may be used instead of the planned lead time. If, for example, the supply chain planning platform has automated that all of the deviations that are categorized as "near tolerance" should use forecasted lead times for future planning, then the forecasted results will be used for further analysis and predictions of future business metrics. If on the other hand, the supply chain planning platform has indicated that "near tolerance" deviations should each be checked individually, then the planner will compare scenarios using planned lead times versus lead times forecast through machine learning, and decide how to proceed. As mentioned, these analyses are best performed on a rapid response platform.

TABLE 3

|                    | Period 1 | Period 2 | Period 3 | Period 4 | Period 5 |
|--------------------|----------|----------|----------|----------|----------|
| Fixed lead time    | 12       | 12       | 12       | 12       | 12       |
| Actual lead time   | 1        | Null     | 1        | 1        | 1        |
| Difference         | −11      |          | −11      | −11      | −11      |
| Absolute difference| 11       |          | 11       | 11       | 11       |

Here, the mean absolute deviation is (11×4) days/4=11 days. Based on the tolerance threshold settings defined above, the absolute mean lead time deviation for this time series is above 10 days and is thus categorized as "outside tolerance". As such, machine-learning forecasting results for this time series may be used instead of the planned lead time. As for the "near tolerance" case, further action depends on what type of action has been set. If, for example, the supply chain planning platform has automated that all of the deviations that are categorized as "near tolerance" should use forecasted lead times for future planning, then the forecasted results will be used for further analysis and predictions of future business metrics. If, on the other hand, the supply chain planning platform has indicated that "near tolerance" deviations should each be checked individually, then the planner will compare scenarios using planned lead times versus lead times forecast through machine learning, and decide how to proceed. As mentioned, these analyses are best performed on a rapid response platform.

Clustering

Clustering (via machine learning) may be used to identify problems in a supply chain. One technique that may be used is the classification of lead-time clusters based on their shape and pattern with respect to lead time. For example, lead-times within a given cluster can help to identify a problem source (e.g. a particular supplier). However, due to the large size of datasets used in supply chain management, the Dynamic Time Warp (DTW) algorithm that is commonly used for clustering, may not be used due its quadratic time-complexity which makes it computationally prohibitive to use. Alternate conventional clustering algorithms (e.g. density-based, hierarchical, iterative, etc.) may not be able to handle the large data set, and lead to poor clustering performance. The key is to find a robust, high-performance clustering technique that is able to handle large data sets (from supply chain data). For example, a data set can include hundreds of thousands to a few hundred million data points.

It was hypothesized that performance may be improved by augmenting the raw data with features (e.g. higher order statistics and available metadata). After iterative experimentation with different features and algorithms, two features were identified that significantly improved the performance of the clustering algorithms: linearity (obtained through linear regressions) and seasonality (obtained through Fourier transform). The quality of a cluster was quantified by employing internal validation measures which were computed based on similarities of data points within a cluster and their dissimilarities to data points in other clusters.

However, validation showed that in some scenarios, clustering full feature space (e.g. where data and each feature are orthogonal dimensions) did not perform as expected as the data points were too noisy or equidistant from each other, making it difficult to have reliable clustering. It was found that by projecting the higher dimensionality dataset to 2-dimensional space, noise was reduced, and clustering performance was improved in some scenarios and the approach was adopted.

As such, a computationally efficient clustering technique was developed that enabled identification of potential issues with a client's supply lines. Given the large amounts of data, it was found that conventional clustering algorithms could not be used in a standard manner. A clustering strategy was developed that uses derived statistics such as trends and seasonality to improve the performance of the clustering algorithms. Additionally, a technique was developed to reduce the noise of results by projecting onto two-dimensional space.

Figure 8:
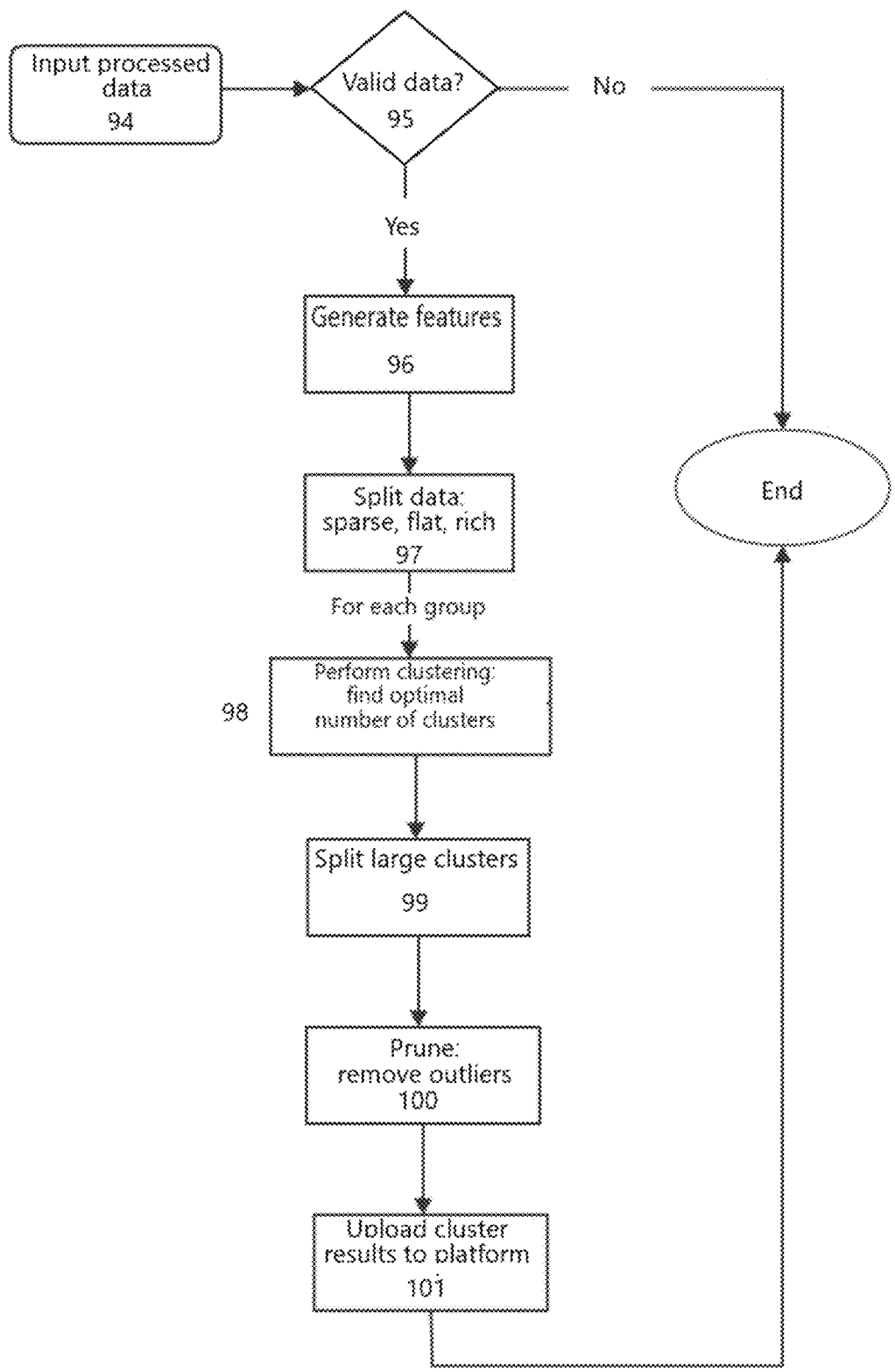
FIG. 8 illustrates a flow chart of the Clustering component of FIG. 3.

FIG. 8 provides a flowchart for an embodiment for cluster analysis. The clustering algorithm retrieves data (94) that has been processed and checks to make sure that the processed dataset is valid (95) for clustering analysis (i.e. it is not empty). Features are then generated (96) for each time series in the dataset.

Figure 9A:
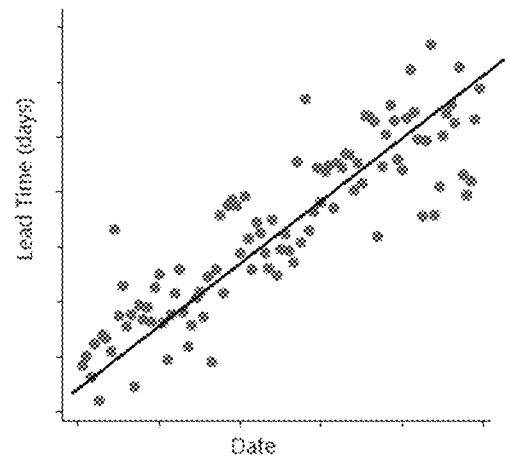
FIGS. 9A-9E provide examples of four features for the clustering analysis.
Figure 9B:
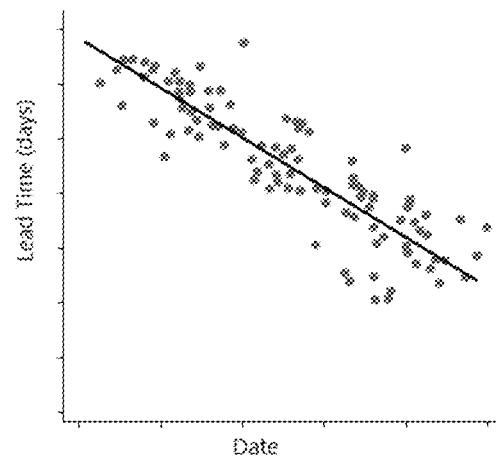
Figure 9C:
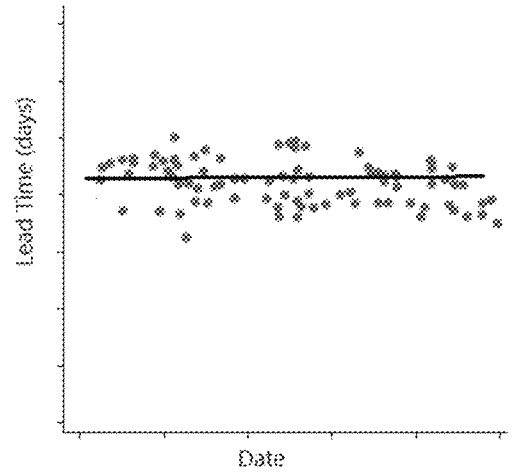
Figure 9D:
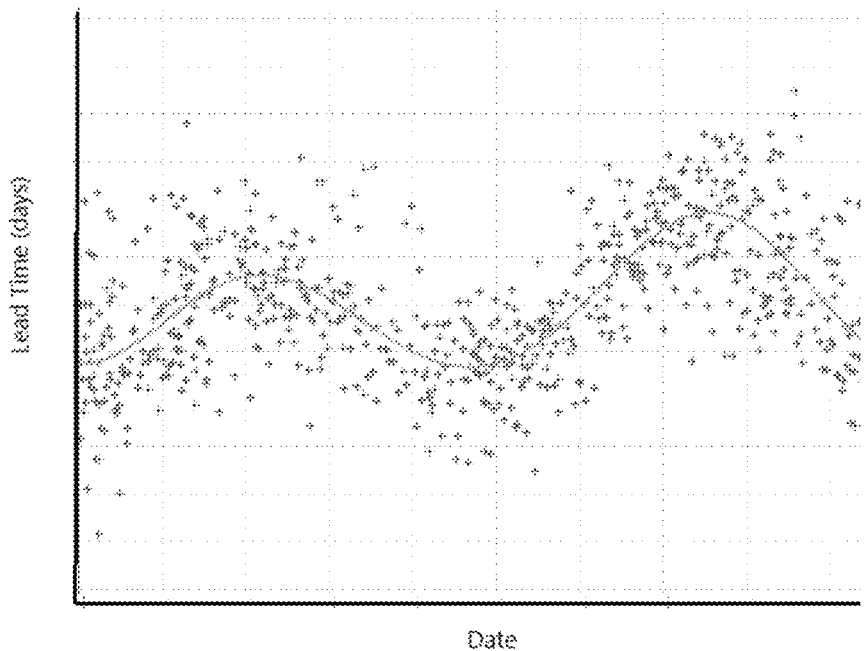
Figure 9E:
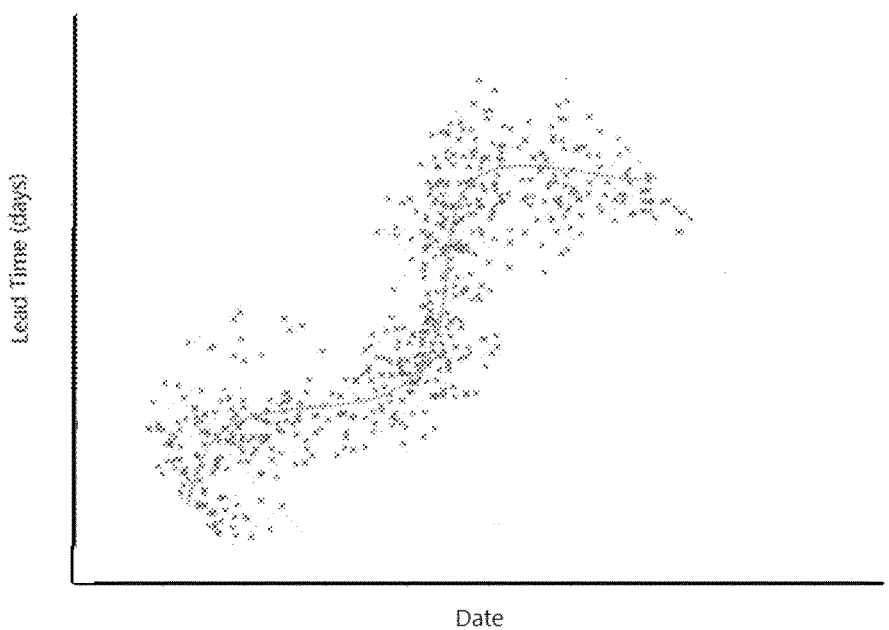

For example, the following four features can be identified: seasonality; upward linearity, flat linearity and downward linearity. Examples of each of the possible four features are shown in FIGS. 9A-9D. In FIGS. 9A-9C, each scatter plot can be approximated by a line of best fit y=mx+b, where 'm' is the slope and 'b' is the y-intercept. In FIG. 9A, m>0 (upward trend), in FIG. 9B, m<0 (downward trend) and in FIG. 9C, m is approximately 0 (flat trend). In FIG. 9D, the scatter plot demonstrates seasonality. FIG. 9E illustrates a scatter plot that has both seasonality and an upward trend (m>0). While four features have been identified, it is possible for more or fewer features may be identified for a clustering analysis.

The data may be then split (97) into three groups, prior to the cluster analysis whether the data in each time series is sparse, flat or rich. For example, if each time series reflects the lead time of a particular item from a particular origin to a particular destination over a period of two years, the time series can have 24 data points (i.e. one data point per month) A time series categorized as "sparse" may have less than a threshold of data points (for example, 12), whereas a "rich"

dataset can have greater than a threshold of data points. A time series categorized as "flat" has the same lead time over the 24-month period.

Clustering may be performed on each of the three groups (i.e. "sparse", "flat" and "rich") by finding an optimum number of clusters (98). The optimum number may be between 2 and 100 clusters. Once the number of clusters is established (for each group), an initial clustering is performed. Within each group, there is an optional step of splitting large clusters (99) further into smaller sub-clusters. Finally, each of the clusters (within each group) may be pruned (100) by removing outlier data, which can be identified, for example, by using a quartile analysis. The final cluster results for each of the three groups can then be uploaded (101) to a supply chain planning platform for further analysis.

Use of Clustering Results

The machine learning clustering analysis may be used to identify problem points in the supply chain. Where a supply chain planning platform provides for rapid processing of hundreds of thousands of time series—i.e. a rapid response platform (as defined above), a supply chain planner can set thresholds in the mean absolute deviation between planned and historical lead times for each time series, leading to "tolerance" zones for each time series, in a manner similar to that described above.

The cluster results, which are uploaded to the supply chain planning platform, can then be filtered first by tolerance zones, and then within each tolerance zone, filtered by specific supply chain identifiers, such as part site, supplier identification, the destination site of the part, the region of the supplier site, the transportation mode for the part, trend (whether the lead times are trending upward, downward or flat), and seasonality (whether the lead times are seasonal or not).

Figure 10:
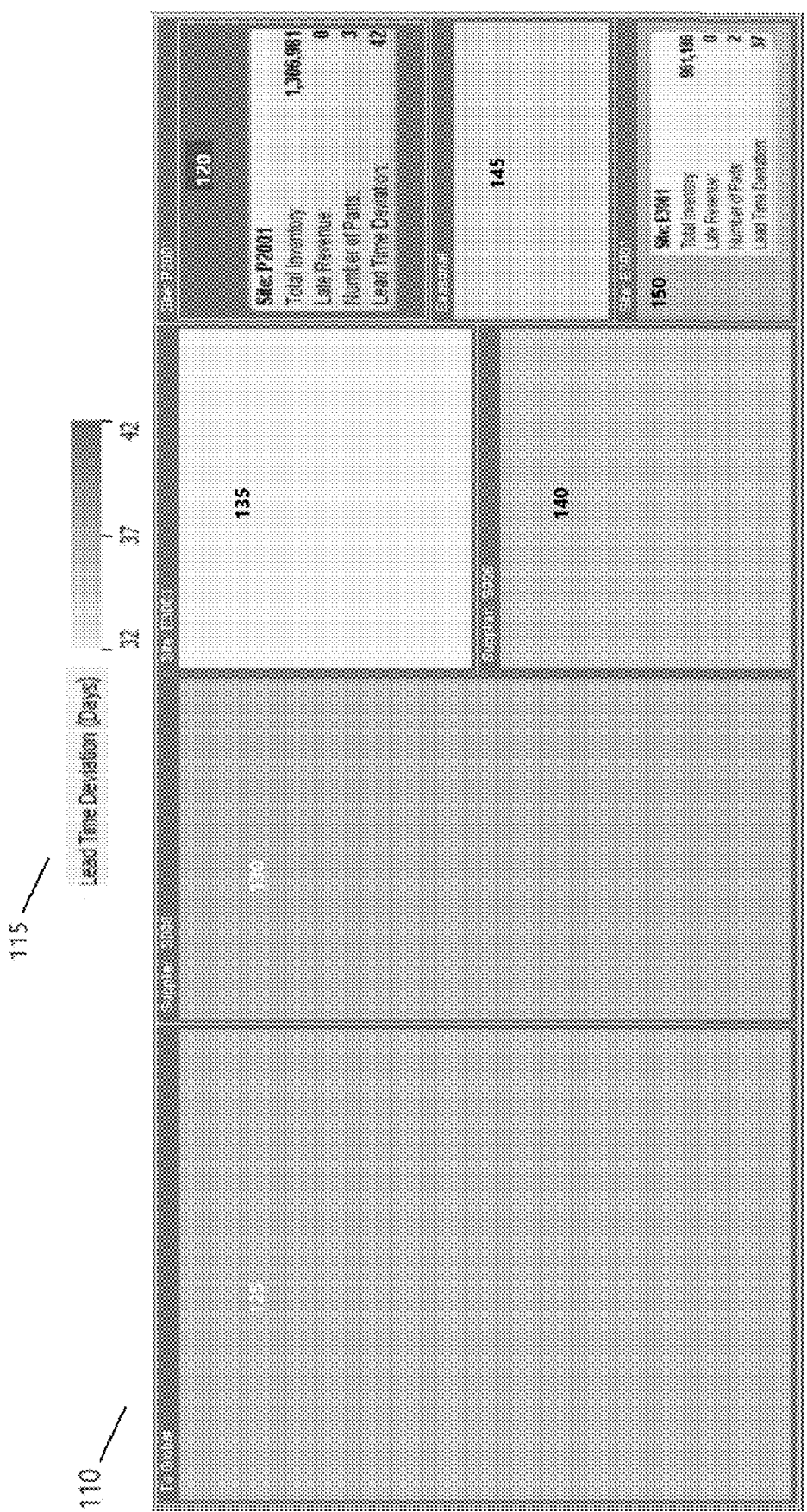
FIG. 10 illustrates a tree map following processing of cluster results.

FIG. 10 illustrates a tree map (110) which depicts clusters of parts that are outside a tolerance zone, which in this example, is defined as 32 days according to the lead times deviation scale (115). All of parts (in each sub-cluster) are late, since the actual lead times have an absolute mean deviation greater than 32 days.

The size of each box represents the number of parts in the cluster. The heading of each box refers to a cluster category. The shading of each box represents the lead time deviation (the darker the shading, the greater, the deviation). For example, the largest box (125) seems to have a lead time deviation of about 37 days (the header "Global" is an identification of a manufacturing site). The next largest box (130), about two-thirds the size of box (125), seems to have a lead time deviation of about 37 days, and refers to a certain supplier, identified as "S008" That is, a sizeable number of parts from supplier S008 has a lead time deviation of about 37 days, which provides a planner useful information about possible issues with supplier S008.

Cluster (135), about half the size of cluster (130), has a shorter lead time deviation of about 32 days (as ascertained by the light shading). This refers to a particular site in the supply chain of all parts, identified as site "E3003". An equal number of parts (to those in cluster (130)), as identified by box (140), however, has a higher lead time deviation of about 36 days. This cluster refers to supplier S006 in the supply chain for all parts.

Next, in the right-hand most column, there are three groups of clusters (120, 145, 150), with a relatively small number of parts (as evidenced by the size of each respective box).

There is a cluster of parts (120) that is represented by the darkest shade, indicating the largest lead time deviation of 42 days. By its size, this cluster represents a relatively small number of parts (the number of parts in this cluster is 3, as shown in the statistics box). The darker shade means that this cluster is not only seriously outside of tolerance, but also places a potentially disproportionate amount of revenue at risk. This dark cluster (120) may be a good place to focus further analysis on a problem point in the supply chain. Its heading points to a particular site, identified as "P2001", which provides a planner instant insight into where the most acute problem in the supply chain may lie (i.e. at site P2001).

The remaining clusters (145) and (150) are slightly smaller than cluster (120), and depict 2 parts each as being outside tolerance Cluster (145) refers to a seasonal cluster, where the lead time deviation is about 34 days, while cluster (150) has a lead time deviation of about 37 days for 2 parts, and refers to a site identified as Site "E3001".

Further analytics can be provided based on a cluster tree analysis. This is shown if FIG. 11, which illustrates business impact and revenue at risk results using analytical tools in a supply chain planning platform that provides prompt analysis (e.g. a rapid response platform, as defined above).

Figure 11:
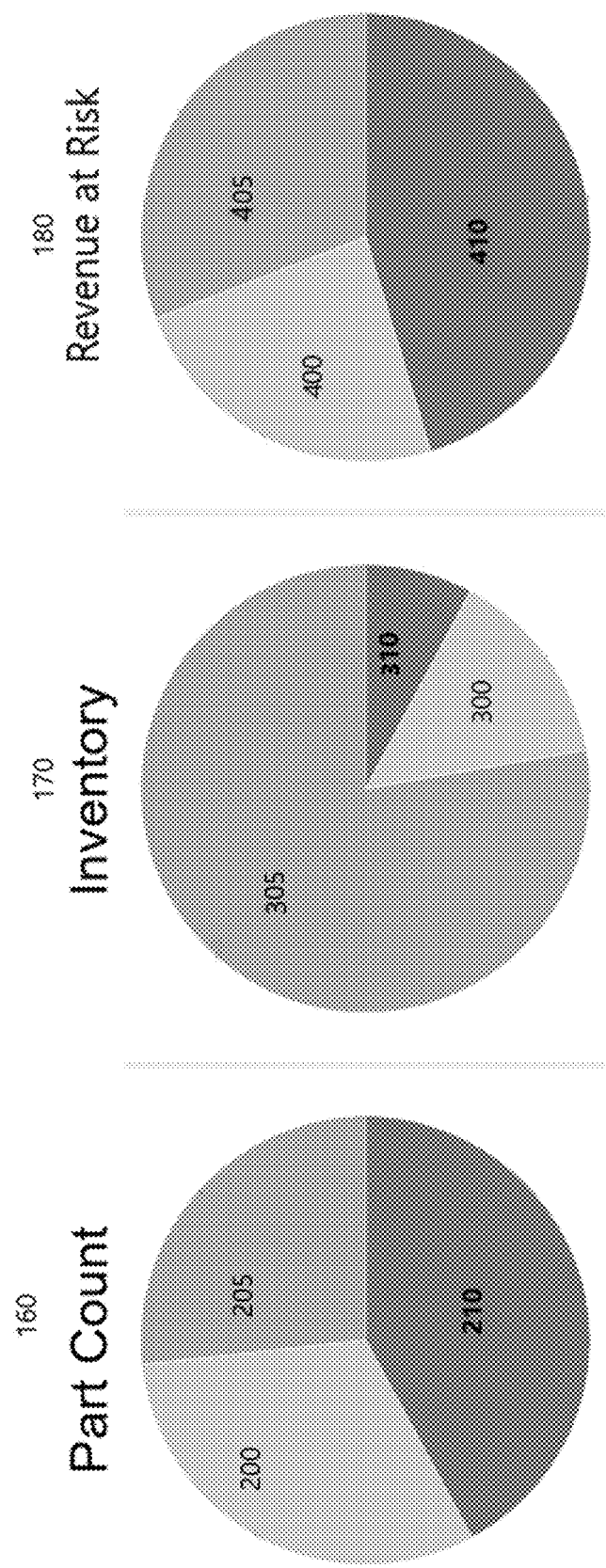
FIG. 11 illustrates business impact and revenue at risk results using analytical tools in a supply chain planning platform.

In FIG. 11, the pie chart labeled Part Count (160) is divided into three segments: inside tolerance (205), near tolerance (200) and outside tolerance (210). Roughly 30% of the items had a demonstrated lead time close to the designed lead time, meaning that the absolute mean value lead time was inside tolerance (205)(i.e. within an acceptable range). About another 30% of items had higher lead time deviations, but where still in a near tolerance zone (200). Finally, around 40% of the items were outside tolerance (210).

The Part Count pie chart (160) doesn't necessarily imply that any action should be taken. However, ramifications of these results may be evaluated by looking at the possible interplay between an Inventory pie chart (170) and a Revenue at Risk pie chart (180). Such results may be provided through analytical tools of a supply chain planning platform, such as a rapid response platform as defined above.

According to chart (170), about 80% of inventory is associated with items that are inside tolerance (305), while 10% is associated with items near tolerance (300). However, only 5% of inventory is associated with items whose demonstrated lead time is outside tolerance (310). According to this analysis, while roughly 40% of items are outside tolerance (based on Part Count chart (160), this leads to only about 5% of inventory having a lead time outside tolerance. However, the inventory quantity in of itself does not provide full information.

A revenue at risk chart (180) shows that approximately 45% of overall revenue is at risk as shown by portion (410). That is, a relatively small number of parts that are in the outside tolerance zone (310) in inventory chart (170) can have a disproportionate impact on revenue. Such an analysis shows that remediating lead time problems with a relatively small number of parts can have an enormous return.

Figure 12:
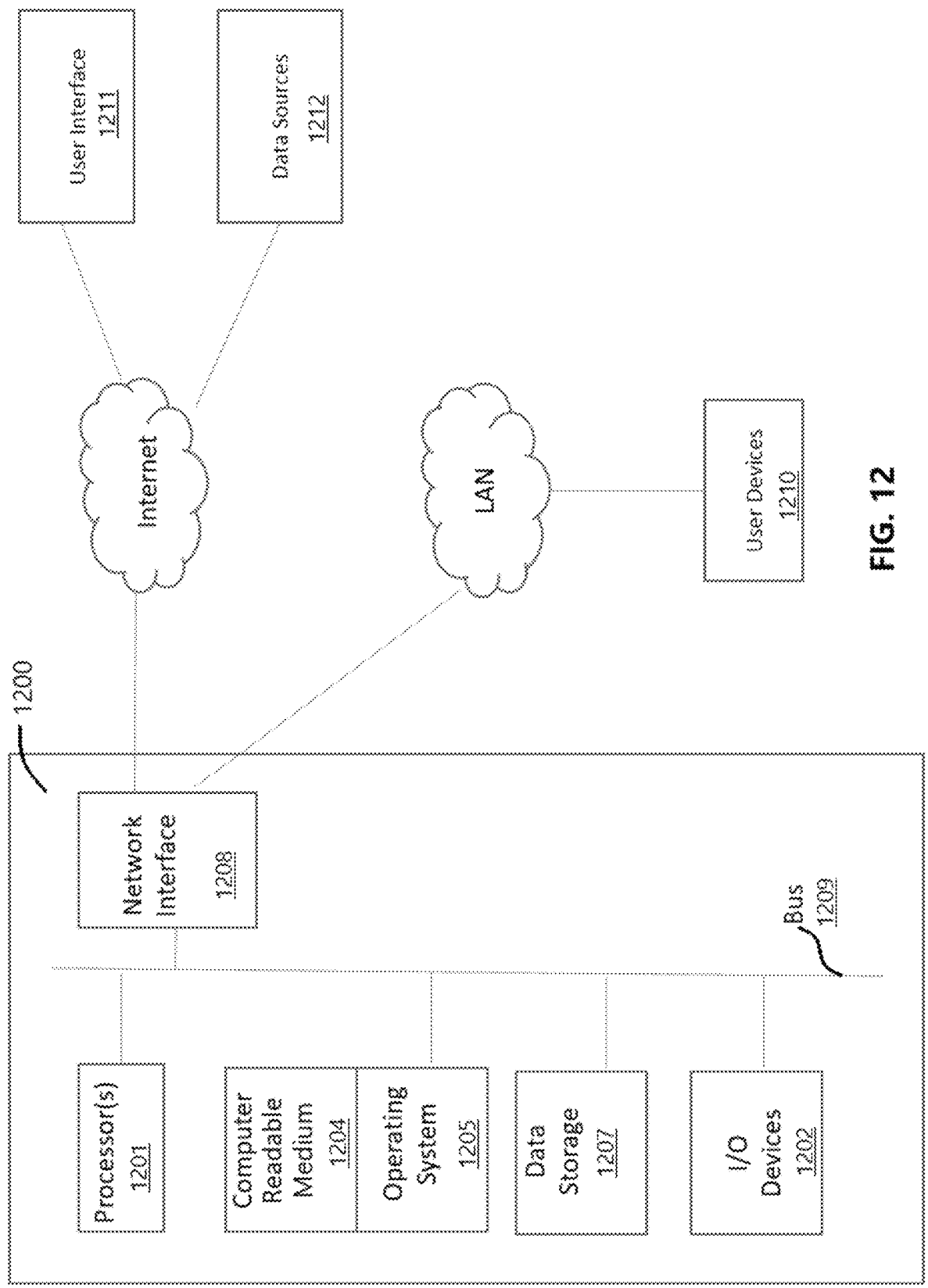
FIG. 12 illustrates a computer system 1200 that may be used to implement the system shown in either FIG. 2A or 2B.

FIG. 12 illustrates a computer system 1200 that may be used to implement the system shown in either FIG. 2A or 2B. It is understood that the illustration of the computer system 1200 is a generalized illustration and that the computer system 1200 may include additional components and that some of the components described may be removed and/or modified. Also, the system shown in either FIG. 2A or 2B may be implemented in a distributed computing system, such as a cloud computer system. For example, the computer system 1200 may represent a server that runs the system shown in either FIG. 2A or 2B or the computer system 1200 may comprise one of multiple distributed servers that performs functions of the system shown in either FIG. 2A or 2B.

The computer system 1200 includes processor(s) 1201, such as a central processing unit, application specific integrated circuit (ASIC) or other type of processing circuit; input/output devices 1202, such as a display, mouse keyboard, etc.; a network interface 1208, such as one or more interfaces for connecting to a Local Area Network (LAN), a wireless 802.11x LAN, a 7G or 4G mobile WAN or a WiMax WAN, or other type of network; and a computer readable medium 1204. Each of these components may be operatively coupled to a bus 1209. The computer readable medium 1204 may be any suitable medium which participates in providing instructions to the processor(s) 1201 for execution. For example, the computer readable medium 1204 may be non-transitory or non-volatile media, such as a magnetic disk or solid-state non-volatile memory or volatile media such as RAM. The instructions stored on the computer readable medium 1204 may include machine readable instructions executed by the processor(s) 1201 to perform the methods and functions of the system shown in either FIG. 2A or 2B.

The computer readable medium 1204 may store an operating system 1205, such as MAC OS, MS WINDOWS, UNIX, or LINUX, and one or more applications, which can include the modules for the system shown in either FIG. 2A or 2B. The operating system 1205 may be multiuser, multiprocessing, multitasking, multithreading, real-time, etc.

The computer system 1200 may include a data storage 1207, which may include non-volatile data storage. The data storage 1207 stores data used by the system shown in either FIG. 2A or 2B (i.e. stores data used by the machine learning services). The data storage 1207 may be used for a data repository (not shown) or the computer system 1200 may be connected to a database server (not shown) for providing the data repository.

End user devices 1210 and other computer systems/servers may also connect to the computer system 1200 via the LAN and network interface 1208. Also, the network interface 1208 may connect the computer system 1200 to the Internet. For example, the computer system 1200 may connect to user interface 1211 and data sources 1212 via the network interface 1208 and the Internet.

Machine learning using Weather and Financial Data

Figure 13:
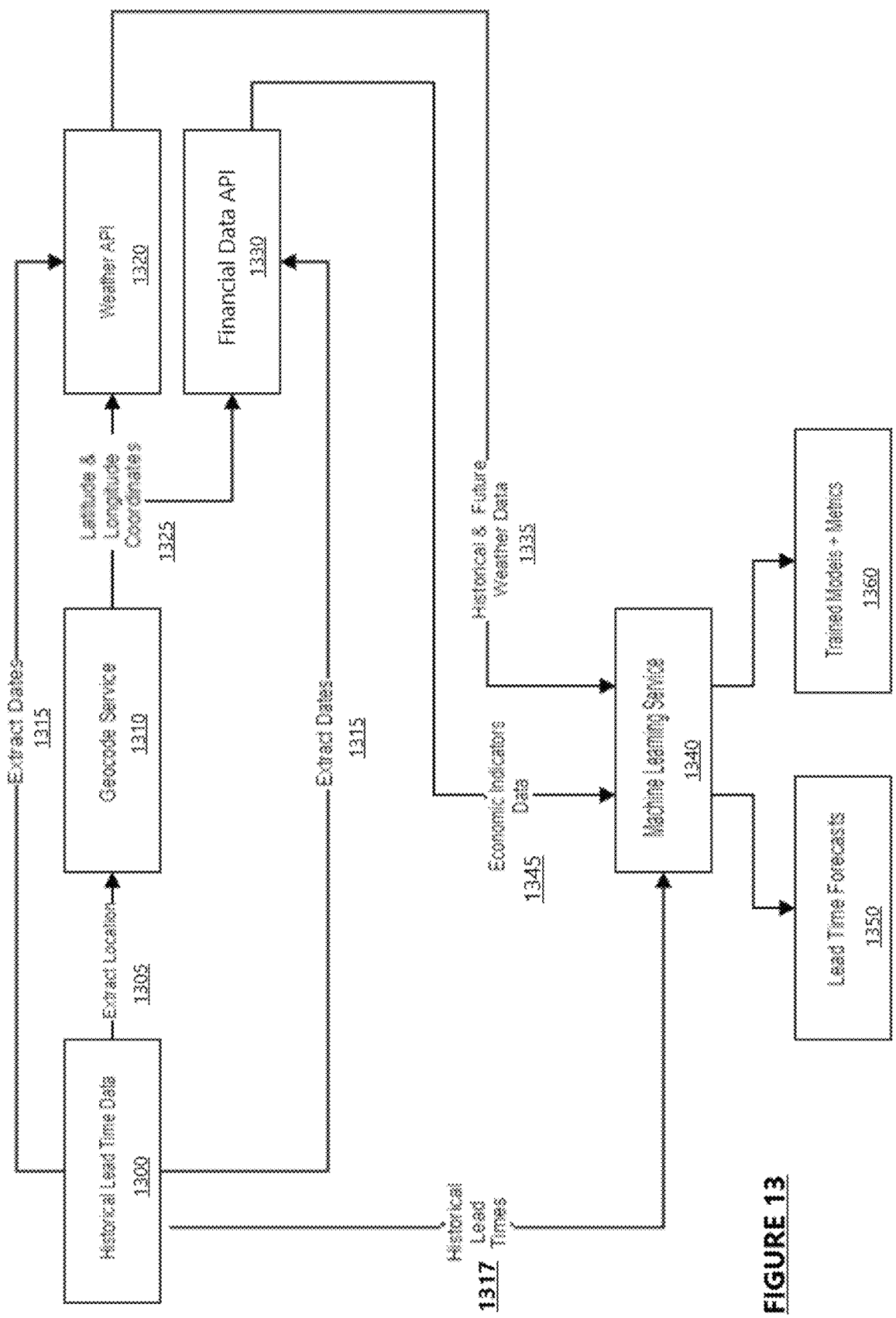
FIG. 13 illustrates a subsystem architecture of an embodiment in which weather and financial data is included in a machine learning service.

FIG. 13 illustrates a subsystem architecture of an embodiment in which weather and financial data is included in the machine learning. In addition to historical lead time data 1300, the machine learning service also uses weather and financial data.

In the example shown in FIG. 13, historical lead time data 1300 includes a source and a destination for each part in the supply chain, along with the date of shipping and lead time data. The location (of source and destination) and dates associated with the historical lead time data 1300, can then be extracted, as described below.

The location for the source and destination in each (source, destination) pair is extracted (1305) from the historical lead time data. Each location is then matched to latitude-longitude coordinates 1325 using a GeoCode service 1310. Such a service can be used through a simple web API request. On the other hand, latitude-longitude coordinates 1325 can be obtained by other suitable services. In an example, if the location given by the historical lead time data does not match any real location, cannot be identified by the GeoCode Service 1310, or does not correspond to actual latitude-longitude coordinates 1325, then every single data point that has an un-identifiable location is not used.

The dates (of shipping from the source, receipt at the destination, lead times) are extracted (1315) from the historical lead time data 1300.

Subsequently, weather data, corresponding to the dates and locations extracted from the historical lead time data, is retrieved from a weather data source via a Weather API 1320. An example of a Weather API is the Aeris Weather API. Data obtained via the Weather API usually includes a set of several measurements throughout a given day, all containing the same features (e.g. temperature, air pressure, humidity, etc.). The weather data for a given date can then be averaged to produce a daily average. The Weather API may also provide future weather data. As such, historical and future weather data 1335, extracted from the Weather API 1320, for each source location, each destination location, and dates in the historical lead time data, are then used by the machine learning service 1340. In some embodiments, if the there is no weather data available for a requested date and location, the data point is not used for machine learning.

Similarly, the extracted dates 1315 and extracted latitude/longitude coordinates 1325, are also used to extract economic indicators data 1345 from a financial data source via a Financial Data API 1330. As an example, the World Bank API may be used.

The resulting historical lead times data 1317, historical and future weather data 1335 and economic indicators data 1345 are then used by the machine learning service 1340 which provides lead times forecasts 1350 and trained models (plus metrics) 1360.

Figure 14:
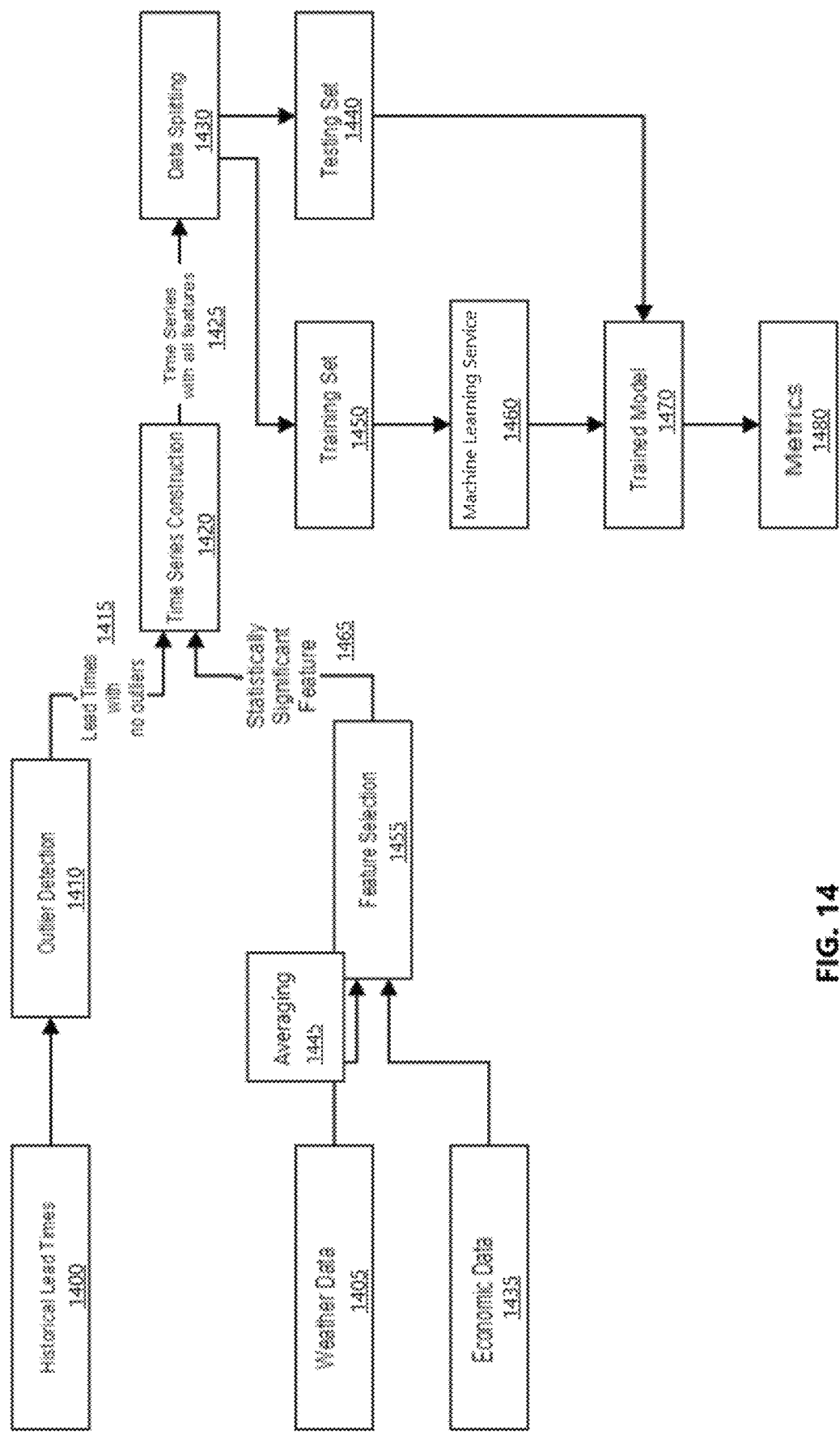
FIG. 14 illustrates the machine learning component shown in FIG. 13 in further detail.

FIG. 14 illustrates the machine learning component shown in FIG. 13 in further detail. As described above, the historical lead times 1400 are filtered 1410 to remove outliers, to result in historical lad times with no outliers 1415.

The weather data 1405 returned by the weather API provides a set of several measurements throughout a given day, all containing the same features (e.g. temperature, pressure, humidity, etc.). Categorical values (e.g. type of weather, wind direction, etc.) may be one-hot encoded. Each type of measurement can be averaged to produce a daily average 1445. These average daily weather 1445 features may then be added to the lead time data 1415.

Variations of the weather data 1405 may be considered, leading to a number of experiments. For example, weather data for both the source and destination on the order date may be used. Another example: the weather data for the source on the order date, and the weather data for the destination on the order date plus the average lead time (as an estimation of the arrival date). Yet another example: weather data for the "large" airport and seaport nearest to both the destination and the source. Another example includes combinations of the three sets of features above. Once the weather data is collected, it may be joined to the lead time data on a per part basis to produce a single time series for each part, by source and destination. Once this time series is produced, the economic indicator data 1435 may then be added. As noted above, if no weather data is available for the request date and location, that data point can be discarded.

Economic data 1435, extracted for relevant dates and locations, may be retrieved from an economic data source such as the World Bank's data API. Indicators provide measures of a country's economic performance, such as Gross Domestic Product (GDP), unemployment rate, percentage of population living in urban areas, etc. Economic indicators for a handful of topics are retrieved for the source and destination countries. The results may then be joined to the existing lead time and weather data. Unlike the weather data 1405, economic indicators 1435 that are not available for every source/destination pair may be kept and simply filled with a constant value, since economic data may be more sparse. For example, certain topics contain many thousands of indicators, while others only have a few dozen or a couple hundred indicators.

All of the processed data (historical lead times, weather and financial data) are provided to a machine learning service 1460 which may run a number of experiments. Examples of experiments include experiments on weather data, shipping hub weather data, economic indicators, etc. Once a number of features have been selected, sub experiments may be performed. For example, a machine learning model may be trained according to the following five sub-experiments, date features, date features plus experiment features; date features plus filtered experiment features; experiment features alone; and filtered experiment features alone. More or less sub-experiments may be performed. The sub-experiments are then performed for each set of features to produce many models. The error of each of these models can then be calculated and compiled to produce a sense of the overall performance of different combinations of features. As an example, Adaboost with regression trees can be used as a model.

As described below, "additional features" refer to the weather and economic indicator features.

Feature Selection

A feature selection module 1455 may be used to include those features that are correlated. Correlations between various features and lead times may be calculated using correlation methods. For example, the Spearman correlation method may be used. Such methods can calculate the statistical correlation between two sets of data points. Subsequently, all of the features with a correlation coefficient whose absolute value is above a certain threshold, can be maintained. As an example, the correlation value can be arbitrarily chosen. In an embodiment, it may be selected to be 0.3 on a scale of 0 to 1 (when taking the absolute values). Such a correlation analysis can filter out unnecessary features (for example, in some cases, it is found that the air pressure is an unnecessary feature). Highly-correlated features are maintained for training the machine learning model.

It is possible that when features are filtered, none of the features may be found to be statistically significant above the given threshold, such that no features are maintained. In this case, the time series is discarded such that the comparison between all of the feature sets and experiments are consistent.

A time series construction 1420 incorporates lead times with no outliers 1415 and statistically significant features 1465. The full time series is then split via a data splitting module 1430; a portion is provided to the training set 1450; the remainder is used for the testing set 1440. The training set 1450 is used by the machine learning service 1460 to provide a trained model 1470. As above, a number of machine learning algorithms may be used to see which provides the best trained model for the data used (i.e. compare the predicted values of the trained model with the test data). The best model is then further enhanced using the remaining testing set, to provide a fully trained model that provides metrics 1480.

Training

As described above, the data may be split into two portions: one for training and one for testing, with the proportionality described as above. As an example, the training portion can use 75% of the data, while the testing can use the remaining 25%. There are a variety of ways to calculate error metrics. As an example, the mean squared error may be used.

Models

A number of models were tested, including AdaBoost (with regression trees), Huber Regressor Linear models and Support Vector Regression models. The Huber Regressor Linear models were tested on the weather data using the AdaBoost approach, but they were found to be outperformed by the regression trees. However, regression trees did suffer from a few issues: they can only predict values previously seen, and so do not perform as well on the testing data sets when the distributions of lead times are different. Additionally, regression trees do not perform well with extrapolation. Experimental results using Support Vector Regression models indicate that at times, these outperform regression. However they require the data to be normalized—otherwise the model predicts a flat line on the testing data regardless of the training parameters. An example of normalization that may be used is Standard Scaler that was fit on the training set and then applied to the entire time series.

Sub-Experiments

For a given experiment (for example—the addition of the weather data), several sub-experiments can be conducted. These sub-experiments may test the difference in performance between the original features and the filtered features. In addition, one may include or exclude the date features present. Various permutations and combinations are possible. Here is an example of five sub-experiments:

1. Control Sub-experiment: only date features
2. Sub-experiment #1: Date Features and all additional features
3. Sub-experiment #2: Date Features and filtered additional features
4. Sub-experiment #3: All additional features, no date features
5. Sub-experiment #4. Filtered additional features, no date features Maim Experiments In non-limiting experiments, main combinations of data explored incorporated one or more of the data types related to the weather data. Examples of experiments included:

1. Weather data
2. Weather data with predictive arrival date
3. Shipping hubs weather data
4. Weather data plus shipping hubs weather data
5. Weather data with predictive arrival date plus shipping hubs weather data
6. Economic indicators data
7. All the features from 1, 2, 3 and 6 above.

Figure 15A:
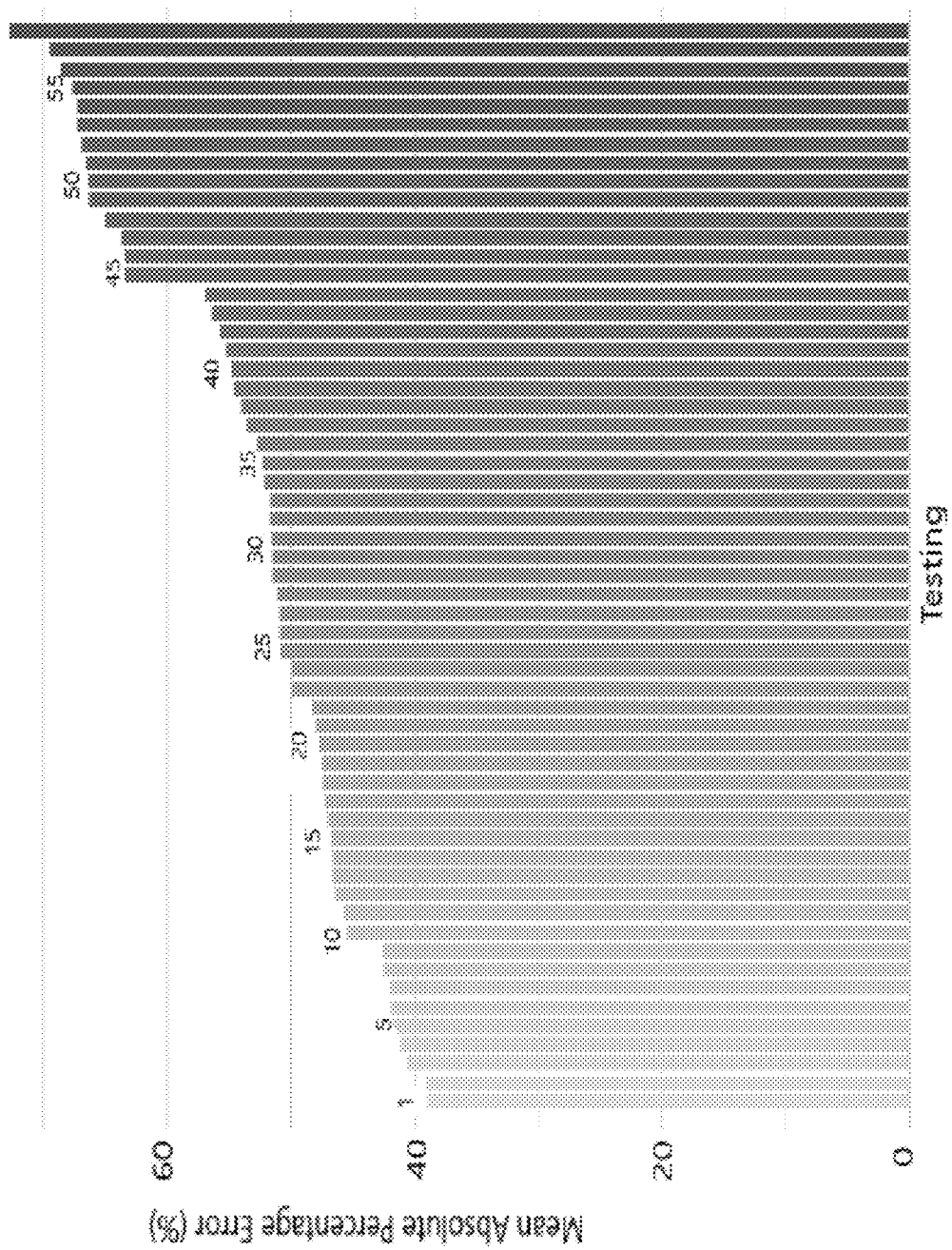
FIG. 15A illustrates test results using weather and financial data, in addition to lead time data, in an embodiment of the machine learning component, while FIG. 15B provides a key to the data presented in FIG. 15A.

FIG. 15A illustrates test results using weather and financial data, in addition to lead time data, in an embodiment of the machine learning component, while FIG. 15B provides a key to the data presented in FIG. 15A.

In FIGS. 15A and 15B, the experiments are denoted by the data types and feature filtering. For example, the weather features and the time features non-filtered designated byweather_time_all_features. Another example includes shipping hubs, weather data, look ahead weather data, economic indicators and the time features—which are designated by hub_future_weather_indicators_time_all_features.

As can be seen from FIG. 15, use of filtered features improves the performance of the model (i.e. relative to the control #42).

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented method comprising:
   receiving, by a processor, historical lead time data from a database;
   extracting, by the processor, a plurality of source locations, destination locations and shipment dates from the historical lead time data;
   extracting, by the processor, weather data from a weather database, the weather data based on the plurality of source locations, the destination locations and the shipment dates;
   extracting, by the processor, economic indicators data from an economic data base, the economic indicators data based on the plurality of source locations, the destination locations and the shipment dates;
   generating, by the processor, processed historical lead time data by removal of outlier data from the historical lead time data;
   generating, by the processor, processed weather data by selection of one or more weather features;
   generating, by the processor, processed economic indicators data by selection of one or more economic indicators features;
   constructing, by the processor, a time series based on the processed historical lead time data, the processed weather data and the processed economic indicators data;
   generating, by the processor, a set of features associated with the time series,
   separating, by the processor, the time series data into one or more groups based on a time density of data points;
   selecting, by the processor, an optimal number of clusters for each of the one or more groups;
   performing, by the processor, using a machine learning algorithm, clustering on each of the one or more groups to provide a plurality of clusters;
   receiving, by the processor, from a user interface, tolerance criteria for separation of the historical lead time data into a plurality of tolerance zones;
   separating, by the processor, the historical lead time data into the plurality of tolerance zones;
   separating, by the processor, the plurality of clusters in accordance with a tolerance zone of each group;
   further separating, by the processor, the plurality of clusters according to one or more lead time identifiers to provide one or more further separated clusters; and
   automatically adjusting, by a supply chain planning system, planned lead times for future purchase orders based on the further separated clusters.

2. The computer-implemented method of claim 1, wherein the set of features associated with the time series relates to linearity and seasonality.

3. The computer-implemented method of claim 2, wherein the set of features comprise seasonality, upward linearity, flat linearity, and downward linearity.

4. The computer-implemented method of claim 2, wherein clustering comprises projection of a higher dimensionality dataset onto a two-dimensional space.

5. The computer-implemented method of claim 1, wherein the time series data is separated into three groups.

6. The computer-implemented method of claim 1, further comprising:
   pruning, by the processor, each cluster;
   dividing, by the processor, each cluster into a plurality of subclusters.

7. A system comprising:
   a processor; and
   a memory storing instructions that, when executed by the processor, configure the system to:
   receive historical lead time data from a database;
   extract a plurality of source locations, destination locations and shipment dates from the historical lead time data;
   extract weather data from a weather database, the weather data based on the plurality of source locations, the destination locations and the shipment dates;
   extract economic indicators data from an economic data base, the economic indicators data based on the plurality of source locations, the destination locations and the shipment dates;
   generate processed historical lead time data by removal of outlier data from the historical lead time data;
   generate processed weather data by selection of one or more weather features;
   generate processed economic indicators data by selection of one or more economic indicators features;
   construct a time series based on the processed historical lead time data, the processed weather data and the processed economic indicators data;
   generate a set of features associated with the time series, separate the time series data into one or more groups based on a time density of data points;

select an optimal number of clusters for each of the one or more groups;

perform, using a machine learning algorithm, clustering on each of the one or more groups to provide a plurality of clusters receive, from a user interface, tolerance criteria for separation of the historical lead time data into a plurality of tolerance zones;

separate the historical lead time data into the plurality of tolerance zones;

separate the plurality of clusters in accordance with a tolerance zone of each group;

further separate the plurality of clusters according to one or more lead time identifiers to provide one or more further separated clusters; and automatically adjust, by a supply chain planning system, planned lead times for future purchase orders based on the further separated clusters.

8. The system of claim 7, wherein the set of features associated with the time series relates to linearity and seasonality.

9. The system of claim 8, wherein the set of features comprise seasonality, upward linearity, flat linearity, and downward linearity.

10. The system of claim 8, wherein clustering comprises projection of a higher dimensionality dataset onto a two-dimensional space.

11. The system of claim 7, wherein the time series data is separated into three groups.

12. The system of claim 7, wherein the instructions further configure the system to:

prune each cluster;

divide each cluster into a plurality of subclusters.

13. A non-transitory computer-readable storage medium, the computer-readable storage medium including instructions that when executed by a computer, cause the computer to:

receive historical lead time data from a database;

extract a plurality of source locations, destination locations and shipment dates from the historical lead time data;

extract weather data from a weather database, the weather data based on the plurality of source locations, the destination locations and the shipment dates;

extract economic indicators data from an economic data base, the economic indicators data based on the plurality of source locations, the destination locations and the shipment dates;

generate processed historical lead time data by removal of outlier data from the historical lead time data;

generate processed weather data by selection of one or more weather features;

generate processed economic indicators data by selection of one or more economic indicators features;

construct a time series based on the processed historical lead time data, the processed weather data and the processed economic indicators data;

generate a set of features associated with the time series, separate the time series data into one or more groups based on a time density of data points;

select an optimal number of clusters for each of the one or more groups;

perform, using a machine learning algorithm, clustering on each of the one or more groups to provide a plurality of clusters receive, from a user interface, tolerance criteria for separation of the historical lead time data into a plurality of tolerance zones;

separate the historical lead time data into the plurality of tolerance zones;

separate the plurality of clusters in accordance with a tolerance zone of each group;

further separate the plurality of clusters according to one or more lead time identifiers to provide one or more further separated clusters; and automatically adjust, by a supply chain planning system, planned lead times for future purchase orders based on the further separated clusters.

14. The non-transitory computer-readable storage medium of claim 13, wherein the set of features associated with the time series relates to linearity and seasonality.

15. The non-transitory computer-readable storage medium of claim 14, wherein the set of features comprise seasonality, upward linearity, flat linearity, and downward linearity.

16. The non-transitory computer-readable storage medium of claim 14, wherein clustering comprises projection of a higher dimensionality dataset onto a two- dimensional space.

17. The non-transitory computer-readable storage medium of claim 13, wherein the time series data is separated into three groups.

18. The non-transitory computer-readable storage medium of claim 13 wherein the instructions further configure the computer to:

prune each cluster;

divide each cluster into a plurality of subclusters.

* * * * *